US011052287B2

(12) United States Patent
Firmin

(10) Patent No.: US 11,052,287 B2
(45) Date of Patent: Jul. 6, 2021

(54) DIGITAL-OPTICAL OBJECT TRACKER

(71) Applicant: Ocula Corporation, Kensington, CA (US)

(72) Inventor: Robert L. Firmin, Kensington, CA (US)

(73) Assignee: Ocula Corporation, Kensington, CA (US)

( * ) Notice: Subject to any disclaimer, the term of this patent is extended or adjusted under 35 U.S.C. 154(b) by 0 days.

(21) Appl. No.: 16/470,331

(22) PCT Filed: Jan. 6, 2019

(86) PCT No.: PCT/US2019/012447
§ 371 (c)(1),
(2) Date: Jun. 17, 2019

(87) PCT Pub. No.: WO2019/136325
PCT Pub. Date: Jul. 11, 2019

(65) Prior Publication Data
US 2020/0023238 A1 Jan. 23, 2020

Related U.S. Application Data

(60) Provisional application No. 62/767,510, filed on Nov. 14, 2018, provisional application No. 62/742,438,
(Continued)

(51) Int. Cl.
*A63B 24/00* (2006.01)
*G01B 11/02* (2006.01)
(Continued)

(52) U.S. Cl.
CPC ........ *A63B 24/0062* (2013.01); *G01B 11/026* (2013.01); *A63B 69/12* (2013.01); *A63B 71/0686* (2013.01); *G01P 3/38* (2013.01)

(58) Field of Classification Search
CPC . A63B 24/0062; A63B 69/12; A63B 71/0686; G01B 11/026; G01P 3/38
See application file for complete search history.

(56) References Cited

U.S. PATENT DOCUMENTS 3,558,228 A 1/1971 Hodges
3,817,621 A 6/1974 Kester
(Continued)

FOREIGN PATENT DOCUMENTS

JP 2003125426 A 4/2003
WO 2009096520 A1 8/2009

OTHER PUBLICATIONS

Paavo Nevalainenl, Real-Time Swimmer Tracking on Sparse Camera Array, 2017, pp. 156-174 (Year: 2017).*
(Continued)

*Primary Examiner* — Twyler L Haskins
*Assistant Examiner* — Fayez A Bhuiyan
(74) *Attorney, Agent, or Firm* — United IP Counselors, LLC

(57) ABSTRACT

A digital-optical tracking device and methods for tracking and timing swimmers are disclosed. The digital-optical tracking device is waterproof and submersible, and includes a stereo optical system that takes digital stereo images of an underwater region. The stereo optical system includes at least two optical elements, each of which forms an image in the stereo image. The tracking methods involve repeatedly determining distances to swimmers by measuring distances between stereo copies of the swimmers in successive, time-stamped stereo images. The methods may use predictive algorithms to determine regions of interest within the stereo images in which the swimmers are likely to be found. Once tracking data is established, it is displayed to the swimmers during their workouts and may be shared among multiple trackers in a peer-to-peer configuration, saved for later
(Continued)

reference, and sent to a coach station or stations for real-time analysis.

20 Claims, 11 Drawing Sheets

Related U.S. Application Data filed on Oct. 7, 2018, provisional application No. 62/614,461, filed on Jan. 7, 2018.

(51) Int. Cl.
    *A63B 69/12*    (2006.01)
    *A63B 71/06*    (2006.01)
    *G01P 3/38*     (2006.01)

(56) References Cited

U.S. PATENT DOCUMENTS

| | | |
|---|---|---|
| 4,119,980 A | 10/1978 | Baker |
| 5,000,565 A | 3/1991 | Hughes |
| 5,136,621 A | 8/1992 | Mitchell et al. |
| 5,517,419 A | 5/1996 | Lanckton et al. |
| 5,622,422 A | 4/1997 | Rodgers |
| 9,217,634 B1 * | 12/2015 | Firmin .................. G01B 11/14 |
| 9,778,622 B2 | 10/2017 | Firmin |
| 10,501,155 B2 | 12/2019 | Firmin |
| 2005/0243651 A1 | 11/2005 | Bailey |
| 2014/0226062 A1 | 8/2014 | Parrill |
| 2015/0245013 A1 | 8/2015 | Venkataraman et al. |
| 2016/0173833 A1 | 6/2016 | Siann et al. |
| 2017/0178524 A1 | 6/2017 | Firmin |
| 2018/0054604 A1 | 2/2018 | Boyd et al. |
| 2018/0059679 A1 | 3/2018 | Taimouri et al. |
| 2018/0204474 A1 | 7/2018 | Firmin |

OTHER PUBLICATIONS

International Search Report issued in International Patent Application No. PCT/US19/55066 dated Jan. 9, 2020.
Written Opinion issued in International Patent Application No. PCT/US19/55066 dated Jan. 9, 2020.
Boynton, C, et al., "An Underwater Digital Stereo Video Camera for Fish Population Assessment", Final Report NOAA/NFMS Contract #GE133F04SE1220:SEFSC Underwater Stereo-Video Camera Research, 2006.
International Search Report issued in corresponding International Application No. PCT/US2019/12447 dated May 15, 2019.

* cited by examiner

DIGITAL-OPTICAL OBJECT TRACKER

CROSS-REFERENCE TO RELATED APPLICATIONS

This application claims priority to U.S. Provisional Patent Application No. 62/614,461, filed Jan. 7, 2018; U.S. Provisional Patent Application No. 62/742,438, filed Oct. 7, 2018; and U.S. Provisional Patent Application No. 62/767,510, filed Nov. 14, 2018. All of those applications are incorporated by reference herein in their entireties.

TECHNICAL FIELD

The invention relates to systems and methods for tracking moving objects, such as swimmers, using digitally-driven optical techniques.

BACKGROUND

U.S. Pat. No. 9,217,634 and U.S. Patent Application Publication No. 2017/0178524, both to Robert L. Firmin, disclose methods of timing athletes and counting laps during workouts, particularly for swimmers. These methods are designed to work using minimal computing power, in environments where it is difficult to collect data and any data collected is likely to be noisy—i.e., full of spurious information.

In one embodiment of these references, a portable computing device, like a tablet computer, is placed underwater in a position to observe a swimmer. The computing device has a sensor, like a camera or other light sensor, and provides lap count and timing information to the swimmer in real time. In order to eliminate optical distortion, optical caustics, and other environmental noise, the computing device implements a time series-based algorithm to learn the ambient conditions around the sensor continuously in real time in order to determine when a disturbance observed by the sensor is caused by a swimmer completing a lap.

These systems and methods have proven effective at lap counting and timing. However, neither reference discloses a way of tracking an athlete through an entire lap—at most, these systems and methods can register the presence of an athlete in a relatively limited volume of space around the sensor.

Tracking an athlete through an entire lap can be useful for a variety of reasons. For the athlete and his or her trainers or coaches, full-lap tracking can provide moment-to-moment velocity and pacing information, and potentially, information on the swimmer's biomechanics, e.g., stroke count. For the detection system itself, full-lap tracking can provide more robust end-of-lap and other event detections and can help to distinguish between multiple athletes competing within a sensor's field of view. Additionally, full-lap tracking means that any momentary tracking errors can be quickly corrected as new data becomes available, whereas an error made when a system is not tracking a swimmer for the entire lap may not be correctable at all.

While tracking may involve obtaining an athlete's precise position in three-dimensional space, it usually involves obtaining at least the athlete's linear distance to a defined point—usually the sensor itself—and then following changes in that distance or position as the athlete moves. The distance may be a simple scalar quantity (e.g., 25 feet (7.62 meters)), or it may be a vector quantity (i.e., a direction or bearing may be obtained as well).

Many methods exist for obtaining distance information. One of the older methods is optical rangefinding. Optical rangefinders are disclosed, for example, in U.S. Pat. Nos. 3,558,228; 3,817,621; and 5,000,565, all of which are incorporated by reference in their entireties. These kinds of rangefinders work by optical triangulation: an eyepiece is located at the rear of a housing, and two optical elements, usually either prisms or mirrors, are located at the front of the housing to project images toward the eyepiece in the rear of the housing. Each optical element produces a separate image, and the user rotates one of the optical elements until the two images converge at the eyepiece. A calibrated scale coupled to the rotational mechanism is then used to read the distance to the object.

While optical rangefinding techniques are robust, accurate, and useful, rangefinding and tracking are two different things. In order to track an athlete precisely and accurately for timing purposes, the athlete's range to a fixed point may need to be established tens, hundreds, or even thousands of times within a very short duration of time, something that traditional, manual optical rangefinding techniques are ill-suited for. Additionally, traditional optical rangefinding techniques are both manual and analog in nature; they do not interface with digital timing systems.

BRIEF SUMMARY

One aspect of the disclosure relates to a fixed element digital-optical object tracker. Within a waterproof case, the tracker includes a fixed element stereo optical system. The stereo optical system includes at least one digital optical sensor or camera that has a field of view through an optical window in the case. A main control unit also disposed within the case is adapted to receive a stereo image from the digital optical sensor or camera and to track an object in the stereo image based on a separation distance between stereo copies of the object in the stereo image.

In one embodiment, the stereo optical system comprises a first optical element and a second optical element. The two optical elements are fixed in position, aligned with one another, and spaced from one another. The first optical element receives first light rays and focuses the first light rays at the digital optical sensor or camera. The second optical element receives second light rays and focuses the second light rays at the digital optical sensor to produce the stereo image. The first and second optical elements may be, for example, combinations of mirrors, prisms, or beam splitters.

In another embodiment, the stereo optical system comprises two digital optical sensors or cameras, aligned with each other but spaced from one another.

Another aspect of the disclosure relates to an underwater digital-optical tracking system. The system comprises a digital-optical object tracker as described above and a light module adapted to be worn by a swimmer. The light module is constrained to emit light in a pair of directions that are opposite from one another.

In some embodiments, the system may include a coach station or stations in communication with the digital-optical object tracker. The coach stations may be desktop computers, laptop computers, tablet computers, smart phones, or other such similar devices.

A further aspect of the disclosure relates to a method for tracking a swimmer underwater. The method comprises obtaining a series of digital stereo images of the swimmer during a workout, each stereo image having a separation distance between stereo copies of the swimmer, using a stereo optical tracking device placed underwater in a position to observe the swimmer. For each of the series of digital stereo images, the method comprises deriving, based on the separation distance, a physical distance to the swimmer and determining, based on the physical distances, performance metrics for the swimmer. The performance metrics include at least a lap time and a lap count, and at least some of the performance metrics are displayed to the swimmer during the workout. The physical distance to the swimmer may be derived from the series of digital stereo images using a non-trigonometric function that relates separation distance to physical distance. The non-trigonometric function may be based on empirical data.

In some cases, methods according this aspect of the disclosure may use a predictive algorithm that predicts a region of interest in which the swimmer is likely to be found within a stereo image and confines image processing tasks to that region of interest in order to reduce computational burden.

Other aspects, features, and advantages of the invention will be set forth in the following description.

BRIEF DESCRIPTION OF THE DRAWING FIGURES

The invention will be described with respect to the following drawing figures, in which like numerals represent like features throughout the drawings, and in which.

DETAILED DESCRIPTION

Figure 1:
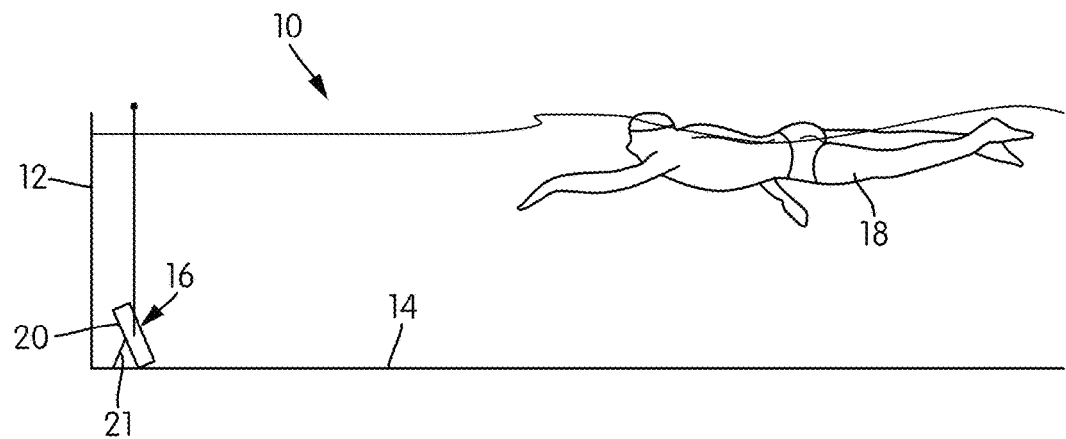
FIG. 1 is an illustration of a swimmer in a swimming pool, showing a digital-optical object tracker according to one embodiment of the invention.

FIG. 1 is a schematic illustration of a swimming pool, generally indicated at 10. The swimming pool 10 has a sidewall 12 and a bottom 14. The swimming pool 10 may be of any size or characteristics, although some portions of this description may assume that the swimming pool 10 is intended for competitive swimming and is, e.g. of Olympic size. Standards for Olympic and other types of competitive swimming are set, e.g., by the National Collegiate Athletic Association (NCAA) in the United States or the Federation Internationale de Natation (FINA), the international swimming federation. While those standards differ somewhat within and outside the United States, for purposes of this description, it may be assumed that a typical swimming pool 10 may be 25 meters long, 25 yards long, 50 meters long, or 50 yards long, with a typical lane width between 6 feet (1.8 meters) and 9 feet (2.7 meters). Of course, swimming pools 10 of any size may be used, as may natural bodies of water.

In the swimming pool 10, a digital-optical object tracker, generally indicated at 16, is placed in a position to observe one or more swimmers 18. That position would typically be along the sidewall 12 or bottom 14 of the swimming pool 10. (Here, the term "sidewall" encompasses end walls as well.) In FIG. 1, the digital-optical object tracker 16 rests on the bottom 14 of the swimming pool 10 near the sidewall. It is helpful if the digital-optical object tracker 16 is placed at a depth sufficient to observe any swimmers 18 who might be in a lane. As those of skill in the art will appreciate, if the digital-optical object tracker 16 is placed at a shallow depth, near the surface, its view may be limited to the nearest swimmer 18, with that swimmer 18 blocking the view of any following swimmers 18, whereas at a greater depth, the digital-optical object tracker 16 has a broader view and can see more of the swimming pool 10.

If the swimming pool 10 is too deep for the digital-optical object tracker 16 to be placed on the bottom 14 of the swimming pool 10 and maintain an adequate vertical or horizontal field of view, the tracker 16 may be, e.g., suspended on a strap that hangs down along the sidewall 12, placing the tracker 16 at an appropriate depth. The strap could be held in place by a water bag placed over the end of the strap on the deck of the swimming pool 10, or by other means.

While the digital-optical object tracker 16 is separate and removable from the swimming pool 10 in the illustrated embodiment, it could be permanently installed in the swimming pool 10, e.g., in the sidewall 14. If a tracker 16 is permanently installed in the swimming pool 10, it could communicate and interoperate with any other systems that may be installed, including touch-pad timing systems.

As will be described in more detail below, the digital-optical object tracker 16 tracks the swimmer 18 through an entire lap, establishing the swimmer's range and differentiating between the particular swimmer or swimmers 18 that it is instructed to track and other swimmers who may be in the same lane or in different lanes. The tracking can also be used to determine swimmer speed, lap time, total elapsed or interval time, lap count, and other such data.

Figure 2:
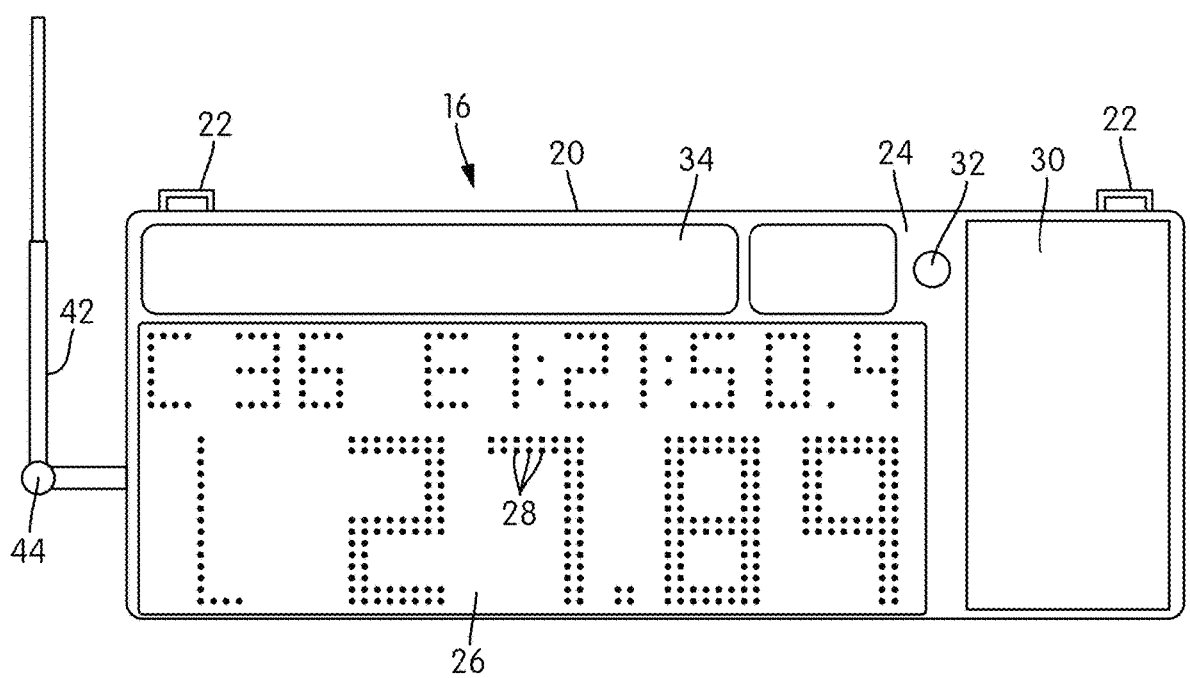
FIG. 2 is a front elevational view of the digital-optical object tracker.
Figure 3:
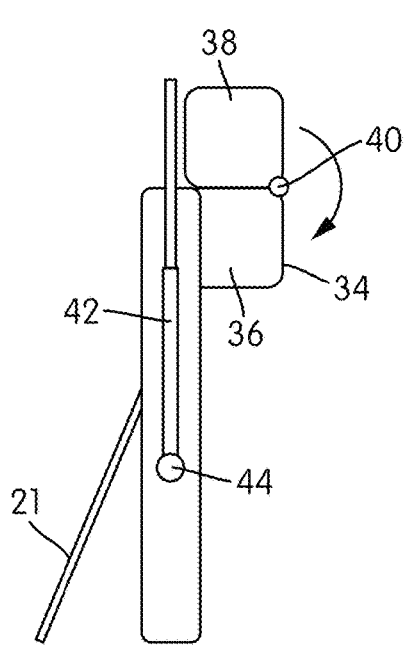
FIG. 3 is a side elevational view of one embodiment of the digital-optical object tracker.

FIG. 2 is a front elevational view of the digital-optical object tracker 16, and FIG. 3 is a side elevational view. In general, the digital-optical object tracker 16 is a computing device capable of detecting and tracking a swimmer. That computing device may be a commercial, off-the-shelf computing device placed in an appropriate case to render it capable of submersion, or it may be a custom-built device. For example, a Microsoft SURFACE PRO® tablet computer may be used as the basis for the digital-optical object tracker 16. However, it may be more advantageous to use custom-built hardware.

The digital-optical object tracker 16 would typically be constructed and adapted specifically for swimming and the underwater environment. As will be described below, the tracker 16 and its software have numerous features that adapt it specifically for underwater tracking of swimmers 18, and particularly for tracking swimmers 18 who are swimming laps. At the most basic level, the tracker 16 is waterproof—preferably able to resist full immersion in water to a depth of about 3 meters, although a depth of 2-2.5 meters may be sufficient in some embodiments. For example, the tracker 16 may carry an ingress protection (IP) rating of at least 68 and the ability to retain that rating over at least several hours of immersion. Additionally, the tracker 16 is most advantageously resistant to the chemicals found and used in swimming pool environments, including chlorine, bromine, and salt (i.e., sodium chloride). The tracker 16 is preferably also at least temporarily resistant to chemicals used to adjust pH, including, for example, hydrochloric acid, sodium carbonate, and sodium bicarbonate. Other chemicals to which the tracker 16 might be incidentally exposed include algicides, fungicides, pesticides, and biological contaminants, such as urine. Chemical and environmental resistance of this type can be achieved, for example, by selecting polymers or other materials that are rated for pool use.

In order to facilitate underwater use, the tracker 16 is sealed within a case 20. The case 20 is waterproof; it includes seals that allow it to resist ingress of water for long periods of time at the expected depths of use. The case 20 may be, e.g., metal or plastic with appropriate elastomeric rubber gaskets or other such features to provide a complete seal. The case 20 could also be welded or otherwise permanently sealed, in which case gaskets may be unnecessary. In some embodiments, the case 20 may be filled with a dry gas, such as dry nitrogen, in order to prevent internal condensation, especially on optical elements. The case 20 would typically be weighted to a negative buoyancy, such that it can sink to the bottom of a swimming pool 10 and remain there in a stable position.

As an alternative to a mechanical case 20 that is sealed around the components of the tracker 16, the internal components of the tracker 16 may be fully encapsulated in, or overmolded with, a plastic resin such that the resin adheres to the internal components and seals them. Thus, for purposes of this description, the term "case" should be read to include overmolded or encapsulating coverings. While a traditional high-pressure injection overmold may be used, pressures used in overmolds of that type can reach several tons. In order to avoid damage to electronics, it may be helpful to use lower-viscosity, lower pressure overmolding techniques (e.g., using 1-3 atmospheres of pressure). As another alternative, resin casting processes, in which low-viscosity resins are simply poured over the components without using any applied pressure at all, may also be used.

The case 20 may have a number of features that allow the tracker 16 to be supported in a variety of positions. For example, a hinged stand 21 (best seen in FIG. 3) allows the tracker 16 to be supported in an upright, angled position on the bottom 14 of the swimming pool 10. A pair of eyelets 22 attached to the case allow the case 20 to be connected to a strap (not shown in the figures). The case 20 may have additional mounting features.

The tracker 16 of the illustrated embodiment performs both tracking functions and display functions, i.e., the tracker 16 is equipped to display its data to the swimmer 18 in real time during the swimmer's workout. As will be described in more detail below, data from the tracker 16 may also be displayed concurrently in other locations, to be seen by a coach, by spectators, or by interested others. Some embodiments of digital-optical object trackers may separate tracking functions from display functions and include no display at all, instead relying on wired or wireless communication to transmit the data to some other display within or outside of the pool. For example, the swimmer 18 may wear swim goggles that include a head-up display or a virtual retinal display, as disclosed in U.S. Patent Application Publication No. 2017/0178524.

To perform its data display functions, the front face 24 of the tracker 16 has a relatively large display 26 that displays lap time, total elapsed or interval time, lap count, and other such data to the swimmer 18. As will be described below in more detail, at least part of this data display would typically be performed in real time during the swimmer's workout. Therefore, the display 26 is large enough to form characters large enough to be seen by the swimmer 18 at a reasonable range when approaching the tracker 16.

In the illustrated embodiment, the display 26 comprises a plurality of individual, addressable LEDs 28. The use of individual LEDs 28 may be more cost effective than a comparable LED pixel color display, and may also offer a higher contrast ratio and other benefits. However, other types of displays may be used, including multi-segment LCD displays and, if desired, LED or OLED pixel displays.

To the right of the display 26 in the illustration of FIG. 2, a control panel 30 is provided. The control panel 30 may contain any type of controls, including physical buttons, dials, and switches. However, in the illustrated embodiment, the control panel 30 is a touch screen. The touch screen may be a capacitive touchscreen integrated with a display, such as an LCD, LED, or OLED display, or it may be a resistive touch screen. In some cases, the control panel 30 may contain all the controls necessary for controlling the digital-optical object tracker 16, but in other cases, physical buttons may be provided for common or critical functions. For example, in the illustrated embodiment, a separate physical power button 32 is located just to the left of the control panel 30 and just above the display 26. The power button 32 could be a resistive touch button. Of course, FIG. 2 illustrates one example of a potential layout for the front face 20 of the tracker 16; any layout or arrangement of controls may be used.

Above the display 26 is an optical window 34. The optical window 34 allows a stereo optical system inside the tracker 16 to track the swimmer 18. The precise configuration of the optical window 34 will depend on the nature of the optical system that is used in the digital-optical object tracker. While the optical window 34 of FIG. 2 is a single, rectangular window with rounded corners, its form could vary considerably from embodiment to embodiment. For example, if the optical elements comprise photosensors or digital camera lenses, the optical window 34 could be considerably smaller and shaped differently. There may also be multiple optical windows 34, e.g., spaced from one another across the width of the object tracker 16. Physically, the optical window 34 is transparent to, for example, visible light and may be made, e.g., of glass, polycarbonate, poly (methyl methacrylate) (PMMA) or another such transparent material. The optical window 34 and the elements that sit behind it will be described below in more detail.

As can be seen in the side elevational view of FIG. 3, the optical window 34 serves as the front face of an optics compartment 36. On the whole, the tracker 16 maintains a thin, rectilinear shape, not unlike that of a tablet computer. However, the optics compartment 36 of the illustrated embodiment may bulge outward slightly from the main body of the tracker 16, and may have any volume needed to contain the appropriate optical elements. Of course, the nature of the optics within the optics compartment 36 may be chosen to minimize its size. As will be described below, the choice of optical components and the use of additional components like condensing lenses, can reduce the size and width of the optical compartment 36.

Figure 4:
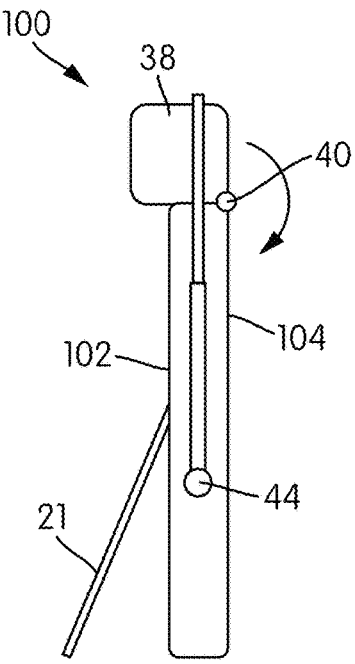
FIG. 4 is a side elevational view of another embodiment of the digital-optical object tracker.

In some embodiments, the optics compartment 36 may be small enough that it is not visible externally. FIG. 4 is a side elevational view of a digital-optical object tracker 100 according to another embodiment of the invention. The tracker 100 does not have an externally-visible optical compartment behind its optical window 34; instead, the case 102 remains generally rectilinear, with a relatively flat front face 104. As will be described below in more detail, the reduced dimensions of FIG. 4 are possible because the tracker 100 uses two digital cameras, instead of a single digital camera or photosensor and an optical system that produces a stereo image. However, it should be understood that compact optical systems may be used, and those systems may also result in a tracker with no bulge or externally-visible optical compartment.

For ease in description, the remaining description will refer to the tracker 16 of FIGS. 1-3. Unless otherwise indicated, the features described can be included in, or implemented on, either embodiment of tracker 16, 100.

A periscope 38 is connected by a hinge 40 to the optics compartment 36 so that it can rotate down over the optical window 34. When the periscope 38 is in position over the optical window 34, the tracker 16 can perform its functions and track a swimmer 18 while lying supine, face up on the bottom 14 of the swimming pool 10. The periscope 38 includes one or more mirrors or prisms that reflect the same, or essentially the same, field of view as that of the optical system 66, the difference being that the optical elements of the periscope 38 are set at an angle, e.g., 40°, that reflects the view of the lane into the optics compartment when the tracker 16 is deployed on, or nearly on, its back on the bottom 14 of the swimming pool 10. The periscope 38 of the illustrated embodiment is but one example—a periscope 38 may be non-pivoting, permanent, or an optional attachment. When the tracker 16 is deployed face-up on the bottom 14, the display 26 may remain on for a period before and after a turn, inverting and possibly displaying different data when the swimmer 18 approaches and when the swimmer 18 passes over the tracker 16 on his or her swim away from the wall.

In addition to the above features, the tracker 16 has a telescoping antenna 42 that articulates in at least one direction around a joint or hinge 44, and telescopes. The antenna 42 may telescope horizontally as well as vertically in order to stay out of the way of a swimmer 18. In some embodiments, the antenna 42 may penetrate the case 20, while in others, the antenna 42 could be inductively coupled to internal elements without penetrating the case 20. The fully-extended height of the antenna 42 would typically be sufficient to penetrate the surface of the water, and the antenna 42 may also extend outward from the body of the tracker 16 if needed. In some embodiments, rather than a relatively rigid, telescoping antenna 42, the antenna could be a flexible wire or cable. In some cases, a float or buoy would keep the terminal portion of the antenna out of the water. As those of skill in the art will understand, while the term "antenna" is used to describe the entire structure 42, the radiating element of the antenna 42 may be considerably smaller, depending on the frequency or frequencies used to communicate. Moreover, the antenna 42 may have multiple radiating elements, each designed for a different frequency or frequency range. Thus, the antenna 42 may support different communication protocols, such as WiFi, BLUETOOTH™, and the like.

Figure 5:
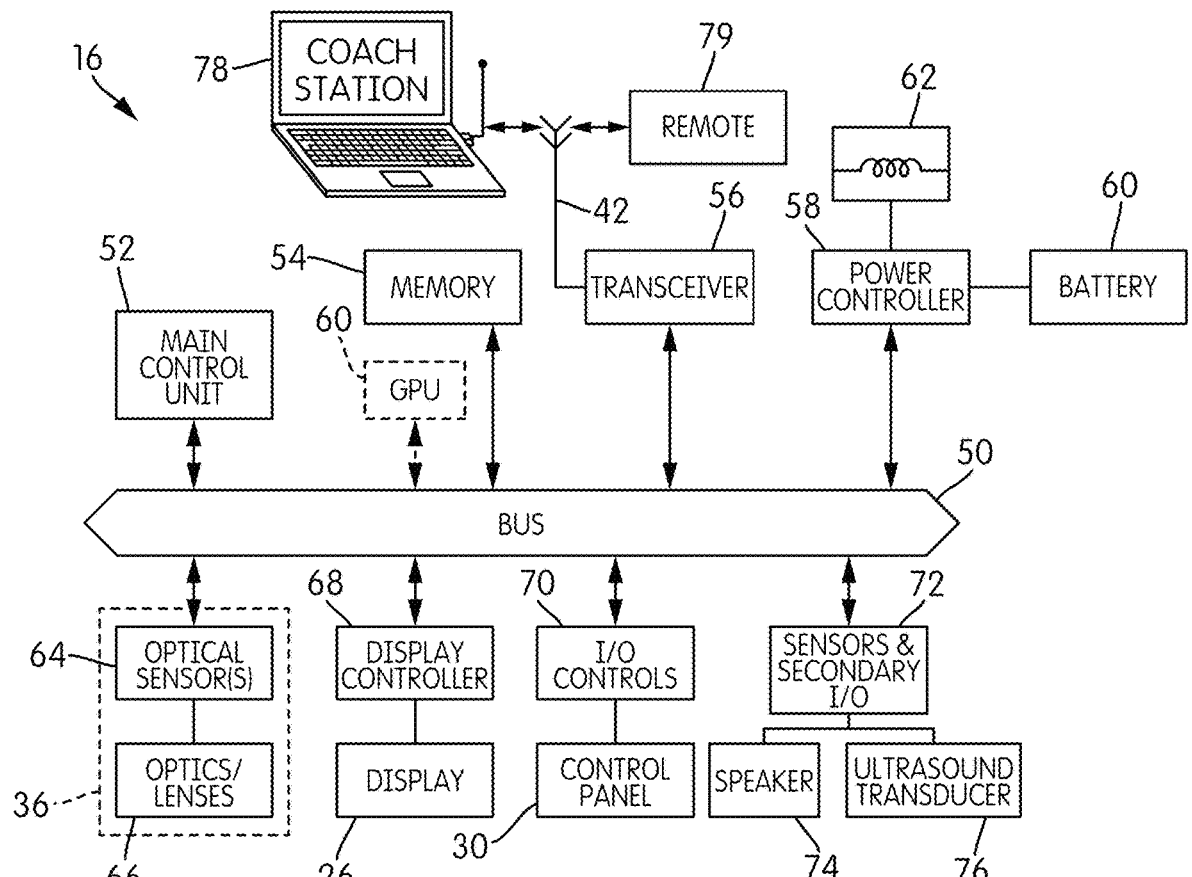
FIG. 5 is a schematic illustration of the components of the digital-optical object tracker of FIG. 3.

FIG. 5 is a schematic illustration of the components of the digital-optical object tracker 16. Fundamentally, the tracker 16 is a computing device. A data bus 50 or other such circuitry facilitates internal communication between the components of the tracker 16. Connected to the bus 50 and in communication through the bus 50 are components typical of a computing device, including a main control unit 52, memory 54, a transceiver 56, and a power controller 58 that controls the charging and discharging of a battery 60. While these components are shown separately in FIG. 5 for ease in description, the main control unit 52, memory 54, transceiver 56, power controller 58, and other computing components may be integrated together as a system-on-a-chip.

The main control unit 52 may be a microprocessor, an application-specific integrated circuit (ASIC), a field-programmable gate array (FPGA) or any other type of computing circuit capable of performing the functions ascribed to it in this description. In some embodiments, a graphics processing unit (GPU) 60 may be included, although for cost reasons, it may be advantageous to omit a GPU if possible. If a GPU is included, it may be a separate integrated circuit, or it may form a part of the main control unit 52. A microprocessor-based main control unit 52 may have any number of processing cores.

The memory 54 within the tracker 16 may be of several types, including read-only memory or other such memory that contains basic system instructions and controls basic functions; cache memory; random-access memory; and data storage memory, such as flash memory or a solid-state drive.

The transceiver 56 allows the tracker 16 to communicate over one or several frequency bands using one or more communication protocols. The transceiver 56 may be or include a WiFi chipset, a BLUETOOTH™ chipset, or a cellular communication modem. The transceiver 56 is connected to the antenna 42.

The power controller 58 and battery 60 are also associated with an inductive charging system 62. As was described above, the case 20 that surrounds the tracker 16 is typically sealed. While the case 20 may have ports that can be covered or uncovered to provide access to the interior and to charge the battery 60 by means of a cable, an inductive charging system 62 allows wireless charging of the battery 60 under control of the power controller 58, so that the case 20 can be entirely sealed with no ports or openings.

Within the optics compartment 36 are one or more optical sensors 64, typically one or two digital cameras that are in communication with the data bus 50. Those optical sensors 64 perceive light though a fixed-element optical system 66 that will be described below in more detail. In many embodiments, the optical sensors 64 will be traditional digital cameras, and this description uses the terms "optical sensor" and "camera" interchangeably. For reasons that will be explained below in more detail, generally speaking, the higher the pixel resolution of the digital cameras, the greater the accuracy of any method used to track swimmers 18. Although the optical sensors 64 may be traditional cameras, they may be modified or used in non-traditional ways. For example, the optical sensors 64 may be adapted to acquire images with constant sensitivity and exposure parameters regardless of the level of incident or background light, i.e., constant shutter speed, aperture, and sensitivity (i.e., ISO). The optical sensors 64 may be modified in some cases to remove physical or software anti-aliasing filters, so as to provide the sharpest possible images. Additionally, the tracker 16 may be adapted to produce and store images in camera raw or another file format that does not distort or introduce artifacts into the image data. Beyond those adaptations, in some embodiments, the optical sensors 64 may be adapted so as to be sensitive only to particular colors. In that case, the colors to which the optical sensors 64 are sensitive would match the color or colors of reflectors or light modules worn by the swimmers 18.

Also in communication with the data bus 50 are a display controller 68 that drives the display 26; an I/O controller 70 that drives the control panel 30; and a controller 72 for secondary or optional devices, such as an underwater speaker 74 and an ultrasound transducer 76. If necessary, tracker 16 could include dedicated heat sink structure.

Figure 6:
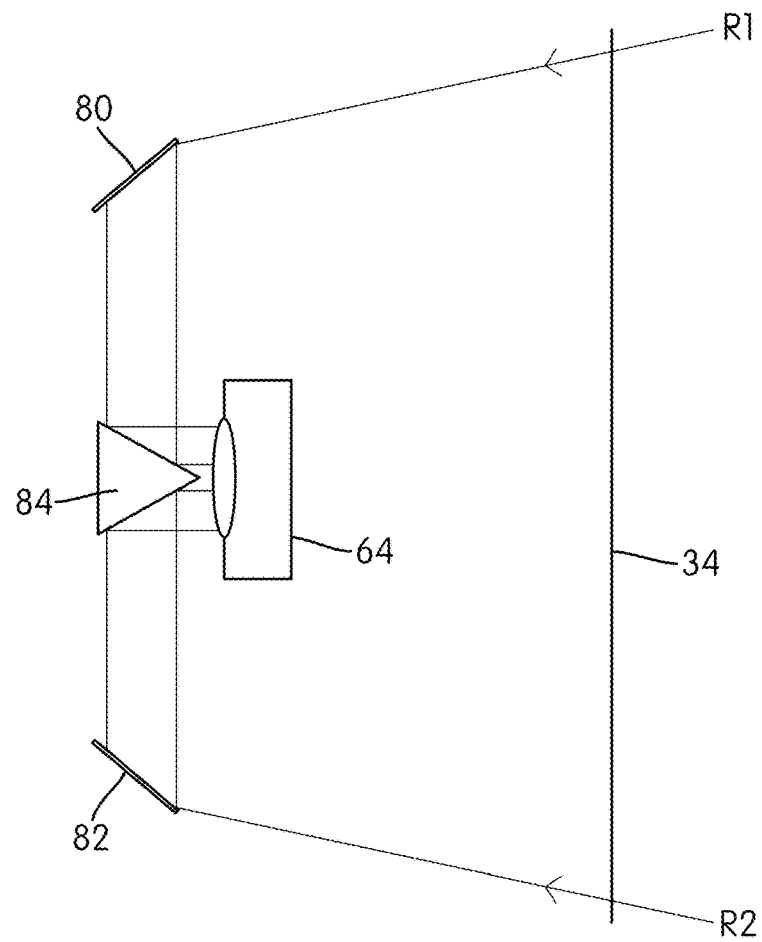
FIG. 6 is a schematic illustration of one embodiment of a stereo optical system that can be used within the digital-optical object tracker of FIG. 3.
Figure 9:
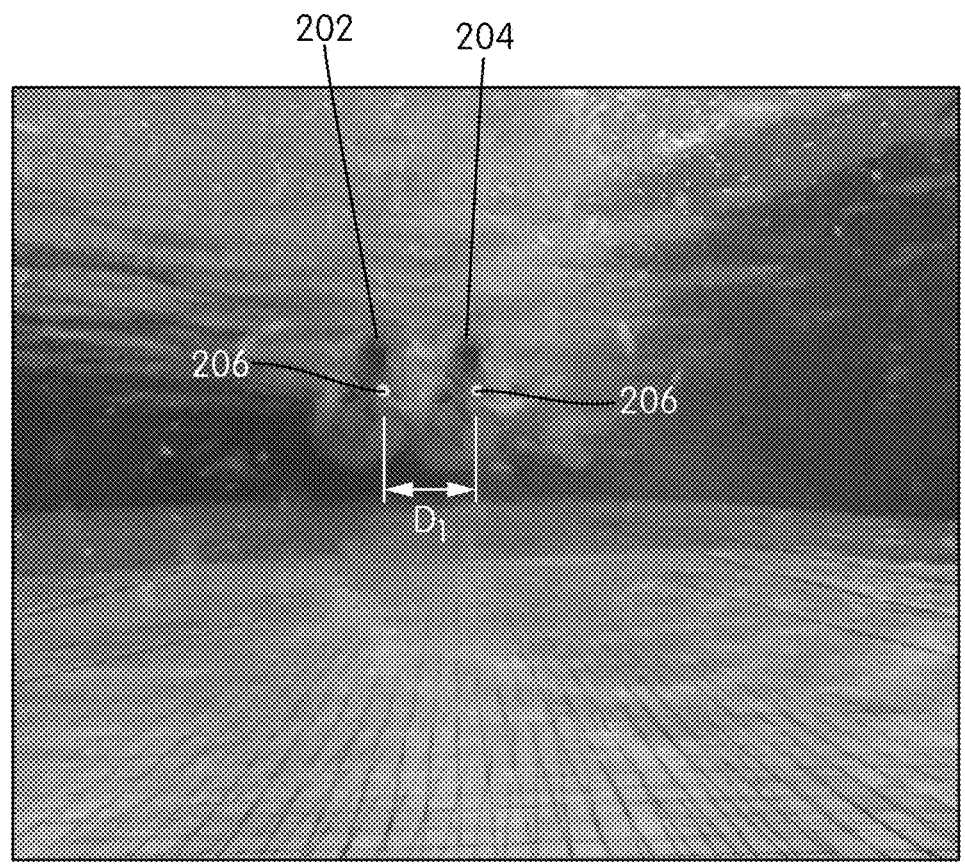
FIG. 9 is an image taken underwater with a stereo optical system.

FIG. 6 is a schematic illustration of a first embodiment of the kind of optical system 66 that would typically be disposed within the optical compartment 36. The optical system 66 is a stereo optical system that produces stereo images. As the term is used here, a "stereo image" refers to a composite image of an object produced by two separate, aligned but spaced-apart optical elements, each of which produces a separate image of the object. (FIG. 9 is an example of a stereo image.) The two separate images of the object in the composite stereo image are referred to as "stereo copies" in this description. The distance between the stereo copies of the object in the stereo image is related to the physical distance between the optical system 66 and the object. It is this relationship that the tracker 16 uses to track the swimmer 18.

In a traditional optical rangefinder, one of the optical elements is movable, and that element is moved manually until the two stereo copies in the stereo image converge into one. However, in the tracker 16 and other embodiments, the optical elements of the optical system 66 are fixed in place, and digital techniques are used to measure the distance between stereo copies in the stereo image and to calculate a physical distance to the object based on the distance between stereo copies.

More specifically, as shown in FIG. 6, an optical sensor 64, in this case, a digital camera, is used in the stereo optical system 66, in this case, facing away from the optical window 34. Two angled mirrors 80, 82 are present, aligned but spaced from one another. Example light rays R1 and R2 enter the optical window 34 and are reflected from the respective angled mirrors 80, 82 toward a prism 84 that directs both rays R1, R2 into the optical sensor 64. In this case, the term "aligned" refers to the fact that the two mirrors 80, 82 are arranged symmetrically on either side of the prism 84, equidistant from it. However, alignment will differ between embodiments, depending on the nature of the optical elements. Thus, the term "aligned" may refer more generally to any arrangement of optical elements that produces a stereo image at the optical sensor 64.

As those of skill in the art will realize, FIG. 6 is a simplified ray-trace to illustrate the components and operation of the optical system 66; the result of this arrangement is a stereo image that is a composite of two separate images, one created by each of the mirrors 80, 82, and both reaching the optical sensor 64 at the same time to form the stereo image. The images created by the mirrors 80, 82 are displaced from one another horizontally in the stereo image recorded by the optical sensor 64 because the mirrors 80, 82 themselves are spaced horizontally apart.

The simplified ray-trace diagram of FIG. 6 neglects the effects of refraction at the interfaces between the water and the optical window 34, and the optical window 34 and the interior of the optical compartment 36, but those effects typically are taken into account when considering the field of view of the tracker 16, as will be described in more detail below.

There are many possible variations of this concept. Essentially any optical element that can reflect or refract light can be used, so long as a stereo image reaches a camera. As a simple example, the mirrors 80, 82 of FIG. 6 could be prisms instead.

Figure 7:
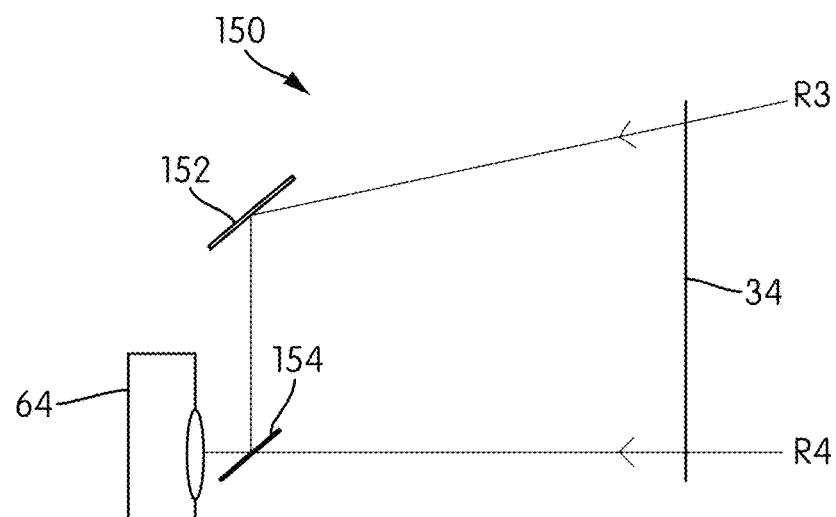
FIG. 7 is a schematic illustration of another embodiment of a stereo optical system that can be used within the digital-optical object tracker of FIG. 3.

FIG. 7 is a schematic illustration of a stereo optical system, generally indicated at 150, that is a variation on the concept of FIG. 6. In the system 150 of FIG. 7, an angled mirror 152 and a beam splitter 154 are used as optical elements, aligned but spaced from one another. Light ray R3 moves through the optical window 34 and is reflected by the mirror 152 toward the beam splitter 154, which directs it into the camera 64. Light ray R4 enters the optical window 34 and transits the beam splitter 154 to enter the camera 64. Notably, the camera 64 faces the optical window 34 in this embodiment. As with the optical system 66 described above, the elements 64, 152, 154 of the system are fixed in place.

Figure 8:
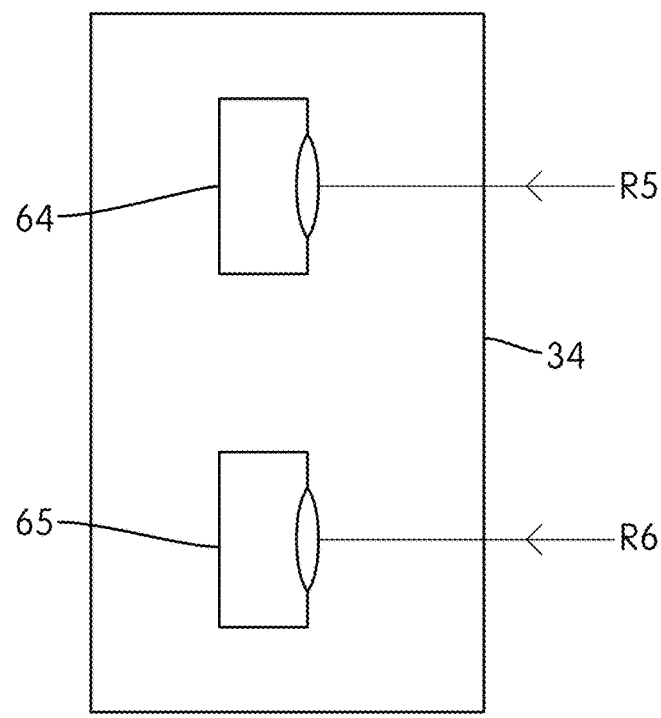
FIG. 8 is a schematic illustration of the stereo optical system of the digital-optical object tracker of FIG. 4.

FIG. 8 is a schematic illustration of another embodiment of a stereo optical system, generally indicated at 200, that produces stereo images. In the optical system 200, two optical sensors 64 are provided, spaced from one another and facing the optical window 34. The two spaced-apart optical sensors 64 receive separate sets of light rays R5, R6 and form separate images. The difference between the stereo optical system 200 and the stereo optical systems 66, 150 described above is that in the systems 66, 150, the two images are optically combined at the optical sensor 64, whereas in the system 200, the two images produced by the two optical sensors 64 are digitally combined into the same frame by a dedicated processing circuit or the main control unit 52. That may require more computational time to achieve; however, one advantage of the stereo optical system 200 of FIG. 8 is that it may consume less space. The stereo optical system 200 of FIG. 8 may be used in the digital-optical object tracker 100 of FIG. 4.

In FIG. 8, the two optical sensors 64 are shown as being aimed parallel to one another. However, that need not be the case in all embodiments. For example, one or both of the optical elements of the optical systems 66, 150, 200 could be directed inward or downward, e.g., approximately 0.5°-2° with respect to the other. Slight differences in position between the two optical sensors 64 may be helpful when searching for a swimmer 18 in the resulting stereo image. Such positioning may also change the convergence point for the stereo image, i.e., the distance at which the two stereo copies of a swimmer 18 in the stereo image converge into one.

In any stereo optical system 66, 150, 200, an additional condensing lens, relay lens, or another type of lens could be used to reduce the size of the optics compartment 36 by shortening the optical path. The use of lenses between the optical elements and the optical sensor or camera 64 may have the effect of reducing the field of view of the optical system 66, 150, 200, which could be useful in some embodiments.

FIG. 9 is an example of an image of a swimmer 18 gathered by a stereo optical system using non-digital optical elements (i.e., mirrors, prisms, beam splitters, etc.) to produce the image. Two stereo copies 202, 204 appear in the image frame, with each feature in one stereo copy 202, 204 spaced from the corresponding feature in the other stereo copy 202, 204 by a distance $D_1$. For a given stereo image like the stereo image of FIG. 9, the distance $D_1$ is the same for all corresponding features of the two stereo copies 202, 204, i.e., a pixel in one stereo copy 202, 204 is always the distance $D_1$ from the corresponding pixel in the other stereo copy 202, 204. The use of these kinds of images to establish a distance to a swimmer 18 and to track the swimmer 18 will be described below in more detail.

As can be appreciated from FIG. 9, the tracker 16 and its stereo optical system 66, 150, 200 are specifically adapted for tracking and timing swimmers in lap swimming situations. For example, the field of view of the optical system 150, 200 used to acquire the image of FIG. 9 encompasses a single lane, and is constrained to photograph the underwater area only. As one example, the horizontal field of view of the optical system 150, 200 in at least some lap swimming embodiments may be about 42°, calculated with the tracker 16 in water. (As those of skill in the art will appreciate, placing the tracker 16 in water will create some refraction as light rays move from the water into the gas-filled case 20 of the tracker 16. The field of view and other optical characteristics of and parameters for the tracker 16 should be calculated with underwater refractive effects in mind.)

While stereo images of this type are useful for establishing the distance to a swimmer 18 and for tracking the swimmer 18, they may have more limited utility if one's objective is to record and analyze the physical stroke technique or other biomechanics of the swimmer 18. For that reason, the optics compartment 36 may include one or more cameras that are not associated with the stereo optical system 66. These additional cameras would be used to gather images and video for biomechanical analysis. The tracker 16 may be used in a system with an external platform or system for capturing video, such as the floating observation vehicle disclosed in U.S. Pat. No. 10,501,155, the contents of which are incorporated by reference in their entirety. In other embodiments, the exterior of the case 20 may include a receptacle for attachment of an exterior waterproofed camera either with or without a connection to the tracker 16.

When making use of a composite stereo image like that of FIG. 9 to establish distance or to track, any feature of the swimmer 18 in one stereo copy 202, 204 may be used as a reference point to establish the distance $D_1$ to the other stereo copy 202, 204, because, as noted briefly above, a point in one stereo copy of the swimmer 18 is always the same distance from the corresponding point in the other stereo copy of the swimmer 18. For example, in some cases, the geometric centers of the stereo copies 202, 204 may be used for calculation purposes. Of course, $D_1$ is different in each individual stereo image because the physical distance between the swimmer 18 and the tracker 16 is different.

However, identifying the stereo copies 202, 204 and then calculating the distance $D_1$ between them is computationally intensive. In order to simplify the process, it may be helpful if there is a single, high-contrast point on each stereo copy of the swimmer 18 that can be easily identified and easily used for a distance calculation. Thus, when using the tracker 16, the swimmer 18 may wear a light or a reflector. This is the case in FIG. 9—the swimmer 18 wears a light module, and a distinct light 206 is visible in each stereo copy 202, 204.

Figure 10:
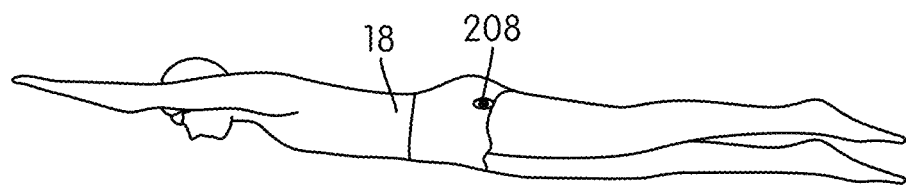
FIG. 10 is a side elevational view of a swimmer wearing a light module.

FIG. 10 is a side view of a swimmer 18 illustrating one way in which a light module or reflector may be worn when using the tracker 16. There are several factors worthy of consideration when selecting and wearing a light module or reflector. First, the light module or reflector should be visible both when the swimmer 18 is moving toward the tracker 16 and when the swimmer 18 is moving away from the tracker 16. Second, the presence of the light module or reflector should not impede the swimmer 18 or cause discomfort.

In the view of FIG. 10, the swimmer 18 wears a light module 208 clipped on the bottom seam of his or her swimsuit, parallel with his or her direction of travel. The light module 208 is adapted to emit the majority of its light parallel to the direction of travel. In the typical embodiment, the direction of travel is along the length of the swimming pool 10 with the swimmer's body nearly parallel to the water surface.

Figure 11:
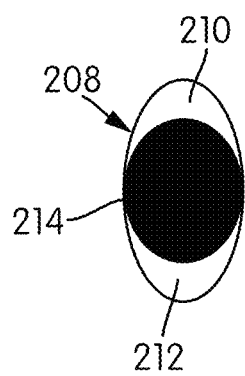
FIG. 11 is a top plan view of the light module of FIG. 10.
Figure 12:
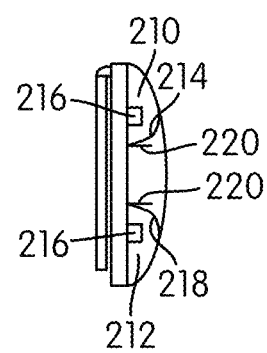
FIG. 12 is a side elevational view of the light module of FIG. 10.

FIG. 11 is a top plan view of the light module 208, and FIG. 12 is a schematic cross-sectional view of the light module 208. Overall, the light module 208 is generally elliptical in shape, with a first emitting element 210 at one end and a second emitting element 212 at the other end. The central portion 214 of the light module 208 typically contains a battery, an inductive charging system, and other such components, and is covered with an opaque, light-blocking material. As shown in FIG. 12, each emitting element 210, 212 includes one or more packaged LED light engines 216 and a reflector 218. The LED light engines 216 may be single-color light engines or red-green-blue (RGB) multi-color light engines, and they may be top-emitting or side-emitting. The reflectors 218 direct as much of the light as possible out of the first and second emitting elements 210, 212 at the prolate ends of the light module 208. Thus, when the light module 208 is worn as illustrated in FIG. 10, most of the light from the emitting elements 210, 212 will be emitted parallel to the swimmer's direction of travel. The outer covering 220 of at least the emitting elements 210, 212 would be translucent. If the LED light engines 216 are not RGB light engines, the covering 220 may be pigmented, so that multiple swimmers 18 can be easily distinguished according to the color of light that their respective light modules 208 emit.

Figure 13:
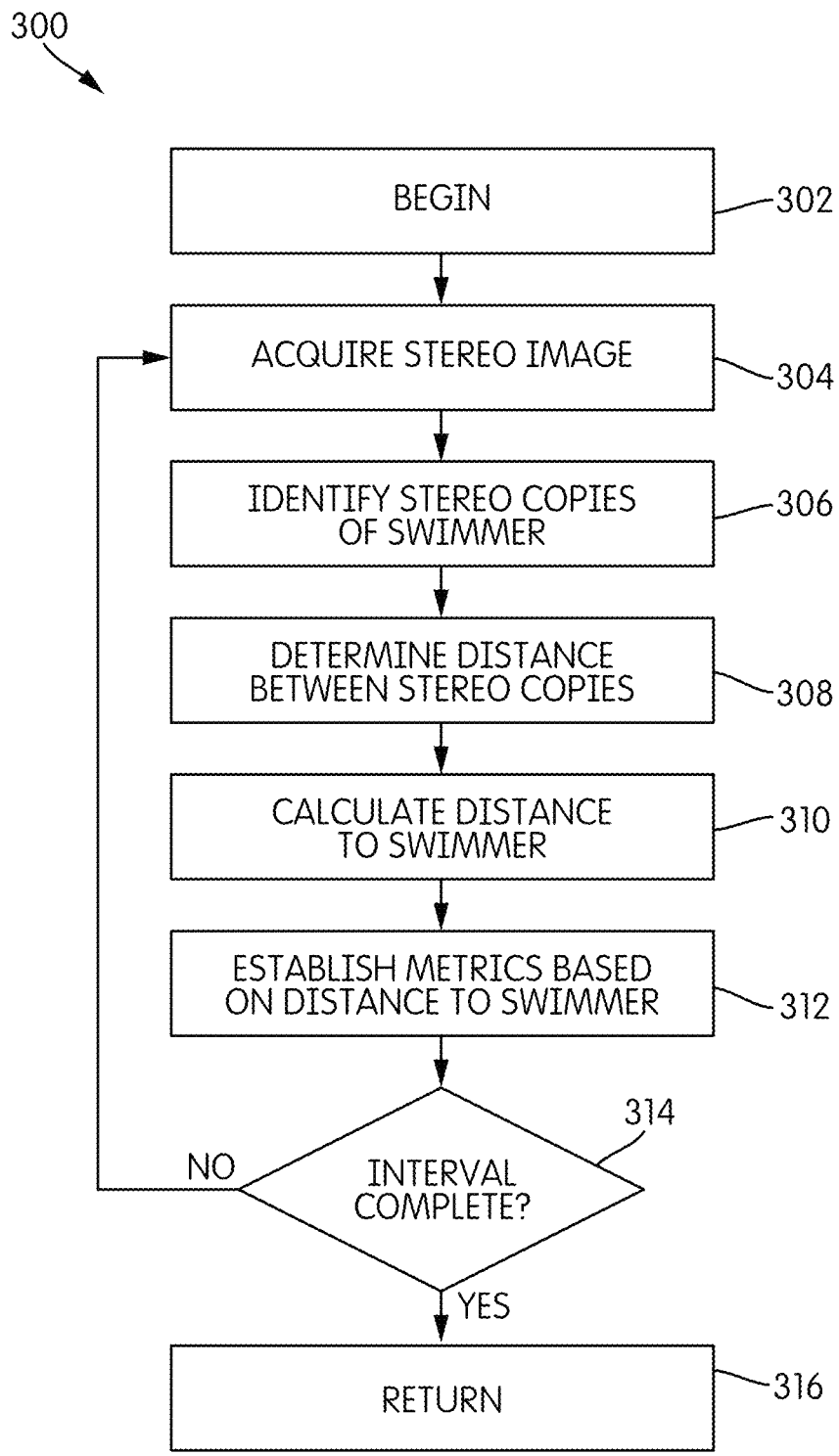
FIG. 13 is a flow diagram illustrating the tasks in a method for using stereo imagery to track and time a swimmer in a lap swimming environment.

FIG. 13 is a flow diagram of a method, generally indicated at 300, for using stereo imagery to track and time a swimmer in a lap swimming environment. While any equipment capable of performing the tasks of method 300 may be used, the remainder of this description will assume that method 300 is performed using a tracker 16.

As method 300 begins at 302, the tracker 16 is placed in a position similar to that shown in FIG. 1, either on the sidewall 12 or bottom 14 of a swimming pool 10. If placed on the sidewall 12, the tracker 16 may be placed at a depth sufficient to see any and all swimmers 18 in a lane, as was described above. Method 300 may include various calibration and startup tasks which would be performed before or during task 302, but which are omitted from the description here for ease of explanation. Method 300 continues with task 304.

In task 304, the tracker 16 acquires a stereo image. As described above and shown in FIG. 9, a stereo image is a composite of images created by multiple optical elements. In some embodiments, a single stereo image will be acquired in task 304 of method 300. In other embodiments, stereo images may be taken by the tracker 16 at a regular interval and stored in a buffer or queue. If stereo images are taken at regular intervals and stored, task 304 may simply involve retrieving the next image from the buffer or queue. Method 300 continues with task 306.

A stereo image of a swimmer 18 taken at virtually all distances to the swimmer 18 will include two stereo copies of the swimmer 18 that, as explained above, are a distance from one another in the stereo image. In a single stereo image at a given distance, all corresponding features of the two stereo copies of the swimmer 18 will be the same distance $D_1$ apart. As the swimmer 18 approaches the tracker 16 from a distance away, in each successive stereo image, the two stereo-copies of the swimmer 18 will be closer together until, at a convergence distance away from the tracker 16, the two stereo copies of the swimmer 18 in the stereo image will converge. Once the swimmer 18 passes the convergence distance, the two stereo copies will move apart in successive stereo images. The reverse occurs as the swimmer 18 travels away from the tracker 16.

In task 306 of method 300, the tracker 16 identifies the stereo copies of the swimmer 18 in the stereo image that was acquired in task 304. This may be done using a variety of different techniques. For example, computer vision and image processing techniques like blob detection may be used to find the stereo copies of the swimmer 18 in the acquired stereo image.

Task 304 may include a number of image processing sub-tasks to make the stereo image ready for detection of the stereo copies of the swimmer, or to assist in the detection. These sub-tasks may include conversion of a color image to black and white or grayscale; adjustment of image brightness and contrast; exclusion of any portions of the stereo image in which a swimmer 18 is unlikely to be found; and other image processing tasks, such as edge detection, thresholding, or other types of filtering. Task 304 may also make use of image segmentation and search algorithms. Additionally, as will be described below in more detail, task 304 may involve using assumptions about the behavior of swimmers 18 in lap-swimming environments to predict the region of the image in which the stereo copies of the swimmer 18 will be found in any particular stereo image and to constrain the image processing and detection operations to the region of the stereo image in which it is predicted that the stereo copies of the swimmer 18 will be found. In some embodiments, the aim of task 304 may be to locate the centroid of each of the stereo copies of the swimmer 18, and while it may be convenient to find and use the centroid of each stereo copy, any point on a stereo copy may be used, so long as the corresponding point in the other stereo copy is also used.

The above description of task 304 assumes that the swimmer is not wearing an identifier, like a tag, reflector, or light module. However, if the swimmer 18 is wearing a tag, reflector, or light module, like light module 208 of FIGS. 10-12, task 304 may be considerably simpler. As shown in FIG. 9, a light module 208 or reflector may create a distinct light 206 that results in the brightest pixels in the image, or at least, the brightest pixels in contrast to their surroundings. In those cases, task 304 may involve searching for the brightest pixels in the stereo image on an absolute basis, or the brightest pixels in contrast to their surroundings. If the light module 208 or reflector is colored, that may be an additional factor useful in detection. Knowledge of the shape of the radiated light 206 can also be used in blob detection and analysis, if necessary. As shown in FIG. 9, the radiated light is roughly circular in shape.

Method 300 continues with task 308, in which, having identified the stereo copies of the swimmer 18 in the stereo image, the tracker 16 determines the distance between the stereo copies of the swimmer 18 in the stereo image. This distance, described above as $D_1$, is the straight-line distance between identified corresponding features of the two stereo copies of the stereo image. Because of the arrangement of the optical systems 66, 150, 200, that distance is usually generally horizontal in these examples. As was noted above, $D_1$ may be measured between any corresponding points on the two stereo copies of the swimmer 18. The initial measurement of $D_1$ will be in pixels, although it may be converted to other units. Method 300 continues with task 310. In some embodiments, a physical or virtual reticle may be used to assist in the measurement of $D_1$.

In some embodiments, Gaussian correlation may be used to identify corresponding pixels in two stereo-copies within a stereo image. In this kind of statistical correlation process, a probability distribution—in this case, a Gaussian distribution—is constructed using the pixel intensities or other characteristics of the pixels representing the light 206 from the light module. The Gaussian distribution from one light 206 is correlated with the Gaussian distribution from the other light 206 as a form of interpolation, in order to improve the accuracy of corresponding-pixel identification and the resulting distance measurements.

In task 310, method 300 calculates the distance from the tracker 16 to the swimmer 18. One way to calculate the physical distance from the tracker 16 to the swimmer 18 is by trigonometry. Trigonometric solutions to problems like this usually involve reducing the problem to a triangle that has at least one leg of a known length and at least one known interior angle, and then solving for the length of the unknown leg of the triangle. For example, in the present case, the swimmer 18 is located some linear distance away from the tracker 16, and it is that distance that is to be calculated trigonometrically. The angle between the tracker 16 and the swimmer 18 can be determined, e.g., by measuring how far the stereo copies of the swimmer 18 are from the center of the field of view, or from one of the boundaries of the stereo image, or alternatively, by using an onboard accelerometer, inclinometer, or gyroscope to measure the angle at which the tracker 16 is set. Another leg of the triangle could be defined either by using the known length between optical elements in the optical system 150, 200, or by using $D_1$, the distance between stereo copies of the swimmer 18, converted from pixel units to distance units.

Given the above, the physical distance to the swimmer 18 could be calculated trigonometrically, e.g., as in Equation (1) below:

$$D_{swimmer} = S_1 \tan \theta \qquad (1)$$

where $D_{swimmer}$ is the distance to the swimmer, $S_1$ is the separation distance of the optical elements or cameras in the optical system, and $\theta$ is the angle to the stereo copies of the swimmer.

While trigonometric solutions can be used in task 310 of method 300, and in other methods according to embodiments of the invention, there are some disadvantages in using these kinds of methods. For example, assuming that the swimmer is up to 50 meters away from the tracker 16, and the distance between mirrors 80, 82 in optical system 150 is on the order of 10 inches (25.4 cm), one ends up with a triangle that has a very long leg, a very short leg, and an interior angle θ that is likely very close to 90°. The value of the tangent function approaches infinity as θ approaches 90°. This means that the tangent function is very sensitive to variability and minor measurement error, because the tangents of, e.g., 88.8° and 88.9° are quite different.

For the above reasons, the use of empirical data that establishes a direct relationship between $D_1$ and the distance to the swimmer 18 in task 310 may be more useful in many embodiments. For example, a series of images may be taken with an object at known distances from the tracker 16. In each case, the distance $D_1$ between stereo copies of the object in the resulting image is determined. In some cases, the object may be a swimmer 18, but in many cases, the object will be a light or reflector. In simple cases, the resulting data may be saved as a lookup table within the tracker 16, and the tracker 16 may interpolate between data points using standard techniques.

While lookup tables and similar representations of empirical data may be used, there are more advantageous ways of using empirical data. In particular, empirical data can be used to create a function that can then be used to calculate the distance to the swimmer 18 using a measured $D_1$ (in pixels, millimeters, or some other unit) quickly and simply. There are many statistical methods for fitting data to a function, and the methods used may vary from one embodiment to another. Regression analysis is perhaps the best-known technique for fitting data to a function, but other methods may be used as well. The type of function to which the data is fit is not critical, so long as the function adequately represents the underlying data as a continuous function across the span of possible distances in a swimming pool 10.

Figure 14:
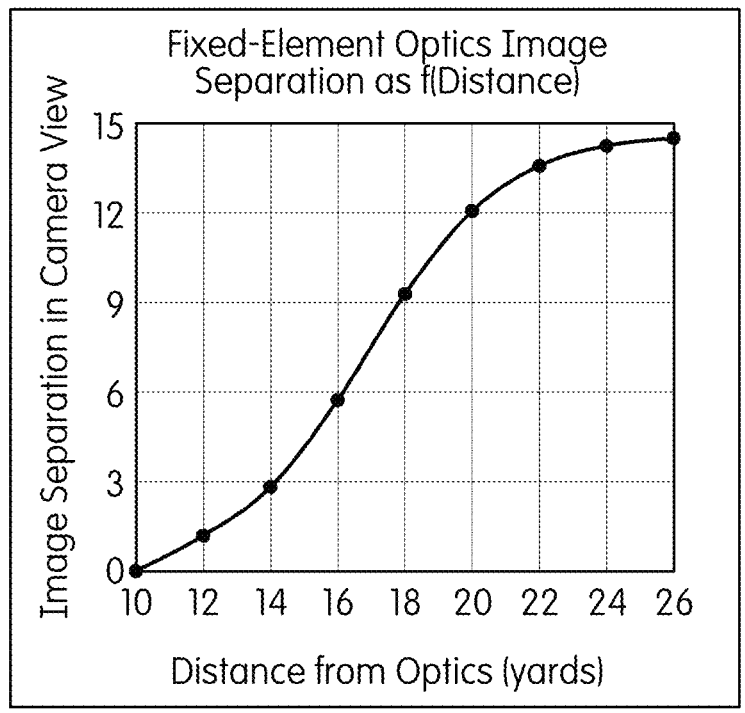
FIG. 14 is a graph of a function, established with empirical data, that relates the distance between stereo copies of a swimmer in a stereo image to the physical distance between the swimmer and the tracking device.

FIG. 14 illustrates an example of a function that relates distance from the tracker 16 to $D_1$, the separation of stereo copies of a swimmer 18 in a stereo image. As shown, the function is a sigmoidal curve, empirically fitted from a number of measured data points. It has the form of Equation (2) below:

$$D_1 = \frac{e^\alpha e^\beta}{(1 + e^\alpha e^\beta)} \quad (2)$$

In Equation (2), β is defined as:

$$\beta = (D_{swimmer} + \alpha)/S \quad (3)$$

where $D_{swimmer}$ is the distance between the tracker 16 and the swimmer 18 and s is the sequential measurement sample number.

Figure 15:
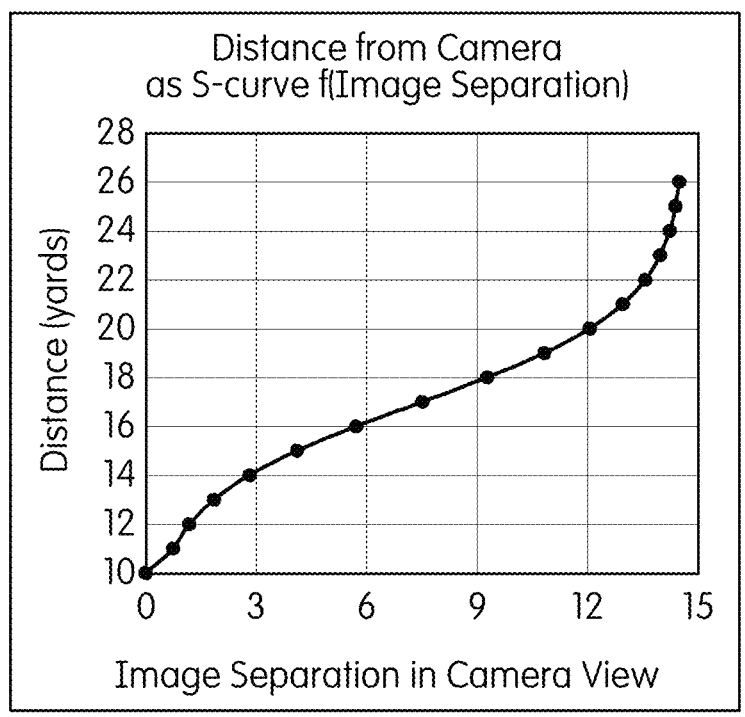
FIG. 15 is a graph of a transform of the function of FIG. 14.

In many cases, a function that is created to represent the relationship between $D_1$ and physical distance to the swimmer 18 may be transformed for easier calculation, such that the distance between stereo copies of the swimmer 18, $D_1$, is the independent variable and ordinate and the distance to the swimmer 18 is the dependent variable and abscissa. For example, FIG. 15 is a graph of a logit transform of the function of FIG. 14, such that $D_1$ is the independent variable and the distance D between the tracker 16 and the swimmer 18 is the dependent variable. This transform of Equation (2) is set forth as Equation (4) below:

$$D_{swimmer} = -\ln\left(\frac{\left(\frac{1}{D_{1(s+2)} - 1}\right)}{\ln(e^\beta)} - 1.5\right) \quad (4)$$

It should be understood that although the empirical data points used to establish the functions in FIGS. 14 and 15 are shown along their respective curves in each figure, the functions themselves are continuous.

The above description contemplates a simple function that relates the spacing $D_1$ of stereo copies of the swimmer 18 with the horizontal linear distance $D_{swimmer}$ to the swimmer 18. More complex variations on this are possible. For example, if a zoom lens is used with the optical system 66, 150, 200 to limit the field of view or gain increased accuracy over certain distances, the relationship between $D_1$ and $D_{swimmer}$ would be different depending on the focal length of the lens. In that case, the tracker 16 could use a function-of-functions, i.e., a function that defines a family of functions, each one of the family of functions describing the relationship between $D_1$ and $D_{swimmer}$ for a different focal length of lens. As a more specific example, assume that, based on empirical data, it is found that a three-term cubic polynomial of the following form accurately describes the relationship between $D_1$ and $D_{swimmer}$:

$$D_{swimmer} = bD_1 + cD_1^2 + dD_1^3 \quad (5)$$

The coefficients b, c, and d define the parameters of that function. The empirically-established function has one set of coefficients b, c, and d. The use of a lens of a particular focal length would most likely result in a function of the same form, but with different coefficients b, c, and d. A function could be defined to derive the coefficients b, c, and d for any given focal length. This function, which derives the coefficients for a family of functions, is the function-of-functions.

This concept of functions-of-functions may also be useful for other purposes. For example, an empirical function that that describes the relationship between $D_1$ and $D_{swimmer}$ would typically be constructed with data over a specific range of distances, e.g., 25 m. It is possible that the swimming pool 10 will have a length that is less than or greater than the range of distances used to establish the empirical function. In that case, a function-of-functions could be defined to derive coefficients or other parameters for a function that covers the actual length of the swimming pool 10 in which the tracker 16 is placed. For that reason, the swimmer 18 may be asked the length of the swimming pool 10 prior to the start of method 300.

While the description above focuses on the use of empirical data to define a function, in some cases, an appropriate function to relate image separation to swimmer distance may be defined based on the underlying optical physics of the optical system 66, 150, 200. Whatever the nature of the function, whether established empirically or derived from the optical physics of the system 66, 150, 200, it is helpful if the function is continuous over at least the range of distances expected in the swimming pool 10.

Once the distance to the swimmer 18 is calculated in task 310, method 300 continues with task 312. In task 312, the tracker 16 updates metrics related to the current swim or workout. The most basic metrics would typically include lap count, lap time and total time, and the speed of the swimmer 18, which can be calculated simply as the distance traveled over particular intervals.

In order to know when a swimmer 18 has completed a lap, it is necessary to define a lap end point. Some of the considerations in defining a lap end point are set forth in U.S. Patent Application Publication No. 2017/0178524, and those considerations apply equally here. More particularly, the lap end point may be defined as the point at which the distance to the tracker 16 equals zero, or it may be defined at any arbitrary distance from the tracker 16. Thus, a swimmer 18 might define a lap end point as being, e.g., 1 meter from the tracker 16.

While the tracker 16 allows a swimmer 18 or his coach to define a lap end point, in most cases, the lap end point will be the wall of the swimming pool 10, where the swimmer 18 either stops or makes a turn. However, the tracker 16 may not be in a position to determine exactly when the swimmer 18 touches the wall (or reaches some other defined end point). If the tracker 16 is not in a position to determine exactly when the swimmer 18 reaches the lap end point, interpolation may be used to determine the lap time. In other words, the tracker 16 may be aware of its position relative to the lap end point, and may interpolate a lap time for the swimmer 18 based on the swimmer's speed as determined from the most recent images. If greater accuracy or an actual detection is required (e.g., for official competitions), the tracker 16 could use an additional, upwardly pointed camera and the light-based detection method of U.S. Patent Application Publication No. 2017/0178524 to determine when the swimmer 18 has passed over the lap end point.

As will be described below in more detail, one related aspect of method 300 concerns when and how data is displayed to the swimmer 18 using the display 26. Typically, the display 26 will be activated to display data to the swimmer 18 while the swimmer 18 is still some distance away from the lap end point, so that the swimmer 18 can appreciate the data before making a turn. In order to provide the swimmer 18 with timing data, the tracker 16 typically interpolates based on the most recent speed of the swimmer 18.

Method 300 continues with task 314, a decision task. If an interval is complete (task 314: YES), method 300 terminates and returns at task 316. If the interval is not complete (task 314: NO), control of method 300 returns to task 304 and another stereo image is acquired.

Here, some definitions may be helpful. As the terms are used here, a "workout" is the complete exercise program that a particular swimmer intends to undertake. An "interval" is a component of a workout that is unique to the swimmer and to the workout. For example, a particular workout could comprise three intervals with rest periods interspersed between. Each interval could comprise a certain number of laps using the same or a different stroke, and each interval could be different from the other intervals. Typically, the workout and its intervals are either selected from a number of pre-set workouts stored within the tracker 16 or programmed into the tracker 16 by the swimmer 18 prior to the workout. In particular, the swimmer may specify rest times between intervals.

Task 314 and the following description assume that the tracker 16 stops tracking at the end of an interval. Determining whether an interval is complete in task 314 may involve a number of individual determinations, any of which could independently mean that an interval is complete. For example, if the swimmer 18 has completed the pre-defined number of laps, the interval is complete. If the swimmer 18 has been swimming for a pre-set amount of time and the interval was set up to terminate after that amount of time, the interval is complete. If the swimmer 18 has not completed a lap after a programmed period of time, the interval may be terminated as well. Typically, the interval parameters used in tasks like task 314 would either be programmed on a remote system and uploaded to the tracker 16, or set using an interactive menu system with the touch screen 30. While not shown in FIG. 13, repeated failure to perform any of the tasks of method 300 may also lead to termination of method 300. Of course, task 314 describes a programmatic end to method 300; the swimmer 18 may stop method 300 manually at any time using the control panel 30 or the optional remote 79.

Method 300 is not the only method or process that may run on the tracker 16. For example, when method 300 returns, another process could be used to time a defined rest period between one interval and the next. While timing the rest period, the display 26 could be triggered to display a countdown and other indicia to the swimmer 18.

One advantage of method 300 is its robustness. Tasks 306-310 in particular will operate on any stereo image, and will locate the stereo copies of the swimmer in the stereo image wherever they may be. That kind of robustness has a cost: those tasks, and particularly task 306, may be computationally intensive. That may be perfectly acceptable if the tracker 16 has adequate computing power to perform task 306 in real time. Yet not all embodiments of the tracker 16 will necessarily have the computing power to do the kind of repeated, brute-force image processing that task 306 entails in real time. For that reason, as described above, light modules 208 or reflectors are used to simplify the identification process somewhat by providing a high-contrast point on which to focus. Additionally, by using different colors, the light modules 208 or reflectors allow the tracker 16 and its methods to distinguish between individual swimmers 18.

Although the kind of brute-force image processing used in method 300 is viable in many embodiments, and may be helpful when the location of a swimmer 18 is unknown or uncertain, lap swimming is a relatively controlled and predictable sport, confined to lanes, and in some cases, the algorithms and methods used for timing and tracking in lap swimming may use assumptions about swimmer behavior in order to simplify algorithms and reduce the computational burden.

Figure 16:
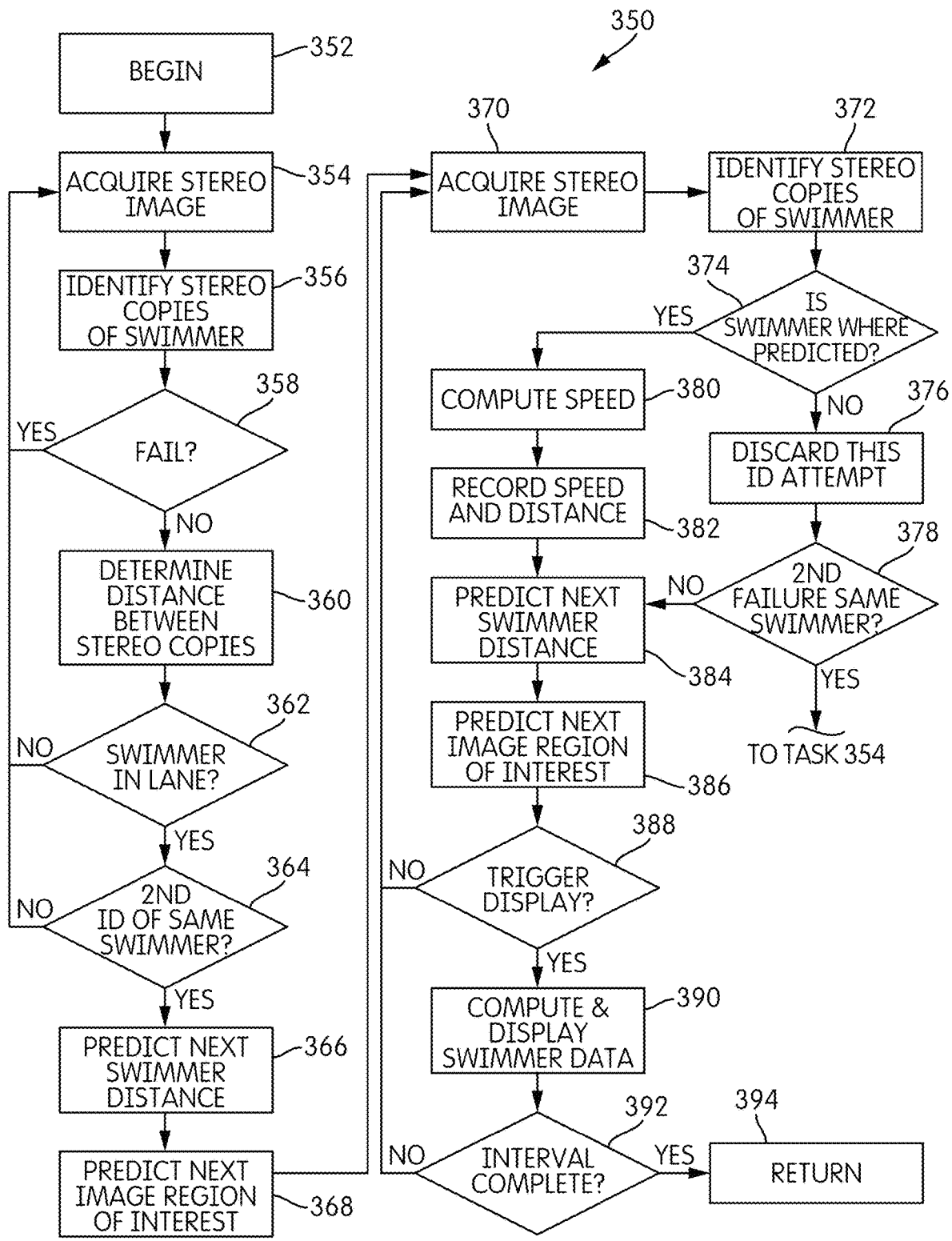
FIG. 16 is a flow diagram illustrating the tasks of another method for using stereo imagery to track and time a swimmer in a lap swimming environment.

FIG. 16 is a flow diagram of a method, generally indicated at 350, for timing and tracking a swimmer 18 in a lap swimming application. Method 350 involves many of the same basic tasks as described above with respect to method 300, including taking a stereo image, locating the stereo copies of the swimmer 18 in the stereo image, calculating a separation distance $D_1$ between stereo copies, and using that separation distance to calculate the linear distance to the swimmer 18. However, as will be described below in more detail, method 350 uses a predictive algorithm to determine where to search for the stereo copies of the swimmer 18 in each stereo image, and uses or discards color information in the image as needed to simplify certain computational tasks, among other features.

Method 350 begins at task 352. Prior to the execution of method 350, or during startup, the swimmer 18 may enter certain parameters into the tracker 16. Those parameters may define the intervals, the workout, or the behavior of the tracker 16 during and related to method 350. These additional parameters will generally be optional, necessary for additional features only, or for informational purposes. Additional parameters may include lap counting up vs. down; splits; number of intervals to swim; which stroke will be used for which interval, or in some cases, which lap; a pace time against which to swim; time ahead or behind of a pace time; a set of drills or intervals; display and encouragement options (text, screen color, video, and audio prompts to encourage the user); and what data to store for later reference.

As one example, a swimmer 18 might specify that he or she intends to swim freestyle for 30 laps as a single interval, and do the breaststroke for another 6 laps as a second interval with a message of encouragement appearing on the display 26 near the conclusion of the twenty-ninth lap in the first interval. The swimmer 18 may or may not specify rest periods between the two intervals. The swimmer 18 might further specify that data from the workout is to be stored for later analysis, and that he or she intends to swim against a pace corresponding to the performance of a famous or accomplished swimmer. Some parameters may be set in the tracker 16 as defaults, but can be modified by the swimmer 18.

Method 350 continues with task 354, in which a stereo image is acquired. Task 354 may be performed in the same way as task 304 of method 300. The stereo image that is acquired in task 354 is preferably time-stamped. It should be understood that the stereo image acquired in task 354 is typically a stereo image of the entire field of view of the tracker 16, similar to what is shown in FIG. 9, and not a stereo image of a particular swimmer 18. In order to minimize computational effort, all swimmers 18 in a lane are preferably identified from a single image.

Once a stereo image is acquired in task 354, method 300 continues with task 356, in which the stereo copies of the swimmer 18 in the stereo image are identified. Task 356 of method 300 includes several sub-tasks, which are shown in more detail in the flow diagram of FIG. 17.

Figure 17:
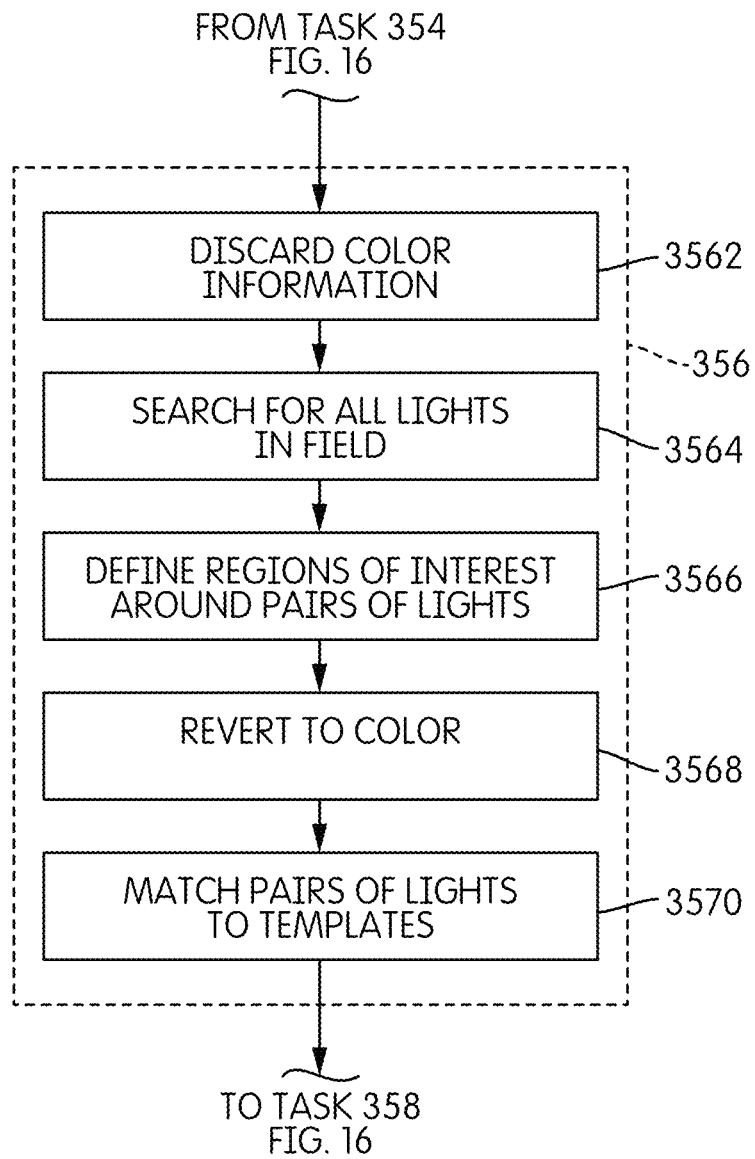
FIG. 17 is a detailed flow diagram illustrating the tasks used to identify stereo copies of a swimmer in the method of FIG. 16.

As shown sub-task 3562 of FIG. 17, task 356 begins by discarding all color information in the stereo image. Once the image is in black and white, task 356 continues with sub-task 3564, in which the system searches for all lights (i.e., bright spots) in the field of search. This can be done with a typical blob detection or edge detection algorithm, looking for bright pixels with neighboring dark pixels. To simplify and shorten the search, the field of search is defined by an initial region of interest, typically a rectangular area within the image. The initial region of interest essentially ignores areas of the stereo image in which a swimmer 18 is unlikely to be found and causes the search to focus on image areas where a swimmer 18 who is just beginning a session is likely to be found. The initial region of interest may be a relatively large portion of the image. If there are multiple swimmers 18 expected to be tracked by the tracker 16, the tracker 16 would typically define a region of interest large enough to encompass all of those swimmers 18.

The search may progress by searching the region of interest in row-major order, in column-major order, or in some other order. When searching in row-major order, it may be helpful if one optical sensor 64 is tilted vertically with respect to the other, because one light may be identified first, before the other. Assumptions may be made in order to keep the search as short as possible. For example, it may be assumed that two lights will be found in the region of interest, and once the assumed number of lights is found in the image, sub-task 3564 may terminate. Nothing prevents additional assumptions or guesses from being made; however, it is helpful if the initial region of interest is defined such that only one swimmer 18 is present in it.

Once lights are found in the stereo image, task 356 continues with sub-task 3566, in which smaller, specific regions of interest are defined around pairs of lights in the stereo image. Essentially, this sub-task identifies paired lights. In this sub-task, some constraints are typically imposed in order to ensure that the lights are actually paired. As one example of a set of constraints that might be imposed in sub-task 3566, the two lights may need to be generally horizontally aligned with each other (e.g., taking into account any tilt of one optical sensor 64 relative to the other), and they may need to be spaced more closely together than a defined maximum possible separation distance in order to be recognized as paired stereo copies. A brightness threshold may also be imposed, based on the light output of the reflectors or light modules 208 worn by the swimmers 18.

As those of skill in the art will appreciate, because of the physical constraints of the optical system 66, 150, 200 and the spacing of optical elements, there is a maximum distance apart at which paired stereo copies in a stereo image can be spaced, which occurs when the swimmer 18 is at the farthest possible distance from the tracker 16. There are also upper and lower bounds on the possible brightness of the reflector or light module 208. Constraints like these help to differentiate lights in the stereo image from optical caustics, refractive effects, and other random bright spots.

Put another way, sub-tasks 3564 and 3566 essentially represent a blob analysis of the acquired stereo image to locate the lights in the image. Any techniques used in blob analysis can be used to perform sub-tasks 3564 and 3566. The use of the initial region of interest in sub-task 3564 helps to shorten the search, while the constraints imposed in sub-task 3566 help to confirm that the lights identified in sub-task 3564 actually represent the position of a swimmer.

Once task 3566 is complete, task 356 reverts to the color version of the acquired stereo image in sub-task 3568, and attempts to match the identified pairs of lights from sub-task 3566 with templates in sub-task 3570. These templates may specify, for example, what color of light is emitted by the light module 208 worn by each swimmer 18, the expected size of the light at given distances, and its expected color profile. (A color profile, information on the range of colors or light wavelengths emitted by the light module 208, is useful because of differential attenuation of different wavelengths of light in water, as well as attenuation of light over distance in water.) In some cases, sub-task 3570 may define smaller regions of interest around the identified pairs of lights in order to define the specific image regions that are to be compared with the templates.

Sub-task 3570 serves as a final check to confirm that an identified pair of lights actually corresponds not only to the position of a swimmer 18, but to the position of a swimmer 18 that method 350 is supposed to be tracking. As each swimmer 18 typically wears a light module 208 emitting a different color, sub-task 3570 also serves to confirm the identity of each swimmer 18. Task 356 ends after sub-task 3570, and method 350 continues with task 358.

Task 358 is a decision task. If any of the sub-tasks of task 356 have failed (task 358: YES), method 350 returns to task 354, another stereo image is acquired, and task 356 is repeated. If there was no failure (task 358: NO), method 350 continues with task 360.

In task 360, the distance $D_1$ between identified, marked stereo copies is determined, as described above with respect to task 308 of method 300. An empirical or theoretical function would typically be used, and in most cases, that function would be non-trigonometric as well. As was described above, it is advantageous if the function that is used to relate the image distance between stereo copies $D_1$ to swimmer distance is not asymptotic around the expected range of input values, and is thus less sensitive to minor variations in measurements of $D_1$. Once the distance to all swimmers 18 in the stereo image has been determined, method 350 continues with task 362.

In task 356, method 350 takes multiple actions to confirm that bright spots in the image actually correspond to a swimmer 18. Once a swimmer 18 has been identified, method 350 includes additional tasks to determine whether the identified swimmer 18 is one that method 350 is responsible for tracking. One of those tasks is task 362, a decision task.

There are a number of reasons why a swimmer 18 might be excluded from being tracked by a method like method 350. One of the most common reasons is that the swimmer 18 is in an adjacent lane, rather than the lane that the tracker 16 is intended to monitor. In task 362 of method 350, a decision task, it is determined whether or not the swimmer 18 is in the lane for which the tracker 16 is responsible. There are several ways of doing this, some making use of knowledge of the operation of the optical system 66, 150, 200, and others making use of data gathered in earlier tasks of method 350.

Figure 18:
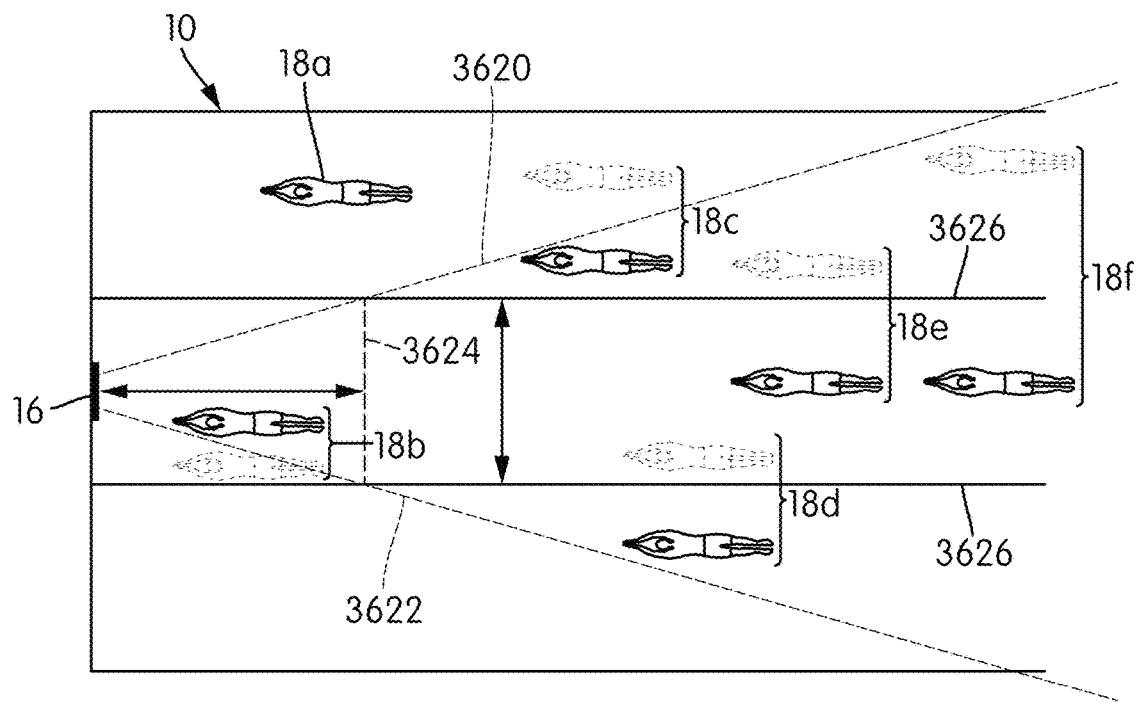
FIG. 18 is a schematic diagram illustrating one method for determining whether a swimmer is in a particular lane of a swimming pool.

FIG. 18 is a schematic illustration of a tracker 16 in a swimming pool 10, illustrating one possible method of determining whether a swimmer 18 is in the lane being monitored by the tracker 16. FIG. 18 uses two lines, indicated at 3620 and 3622, to show the limits of the horizontal field of view of the tracker 16. In this illustration, the tracker 16 is assumed to have a horizontal field of view of about 42° in the water, as was described briefly above. (In this description, the term "about" refers to a range of ±5%.) As can be seen in FIG. 18, this field of view is adequate to view a single lane, although parts of other lanes are also visible to the tracker 16.

Another line in FIG. 18, indicated at 3624, shows the convergence or coincidence distance for the tracker 16, the distance at which the stereo copies of a swimmer 18 in a stereo image will converge and appear as a single copy of the swimmer 18. Lane boundaries 3626 are indicated on the bottom of the swimming pool 10. FIG. 18 also illustrates a number of potential positions of swimmers, both within and outside the field of view of the tracker 16 to illustrate how swimmers at those different positions would be handled when determining whether a swimmer is in the monitored lane. These individual cases are indicated as swimmers 18a through 18f.

In most tasks of methods 300, 350 according to the present embodiments, there is no need to distinguish between one stereo copy of the swimmer 18 and the other stereo copy of the swimmer in the image; the separation distance between the stereo copies is the only relevant factor. However, in some methods of determining whether a swimmer 18 is in the lane being monitored by the tracker 16, it may be useful to make a distinction between the stereo copies.

Taking the optical system 150 of FIG. 7 as an example, there is a direct image, created in optical system 150 by the light ray R4 that hits the optical sensor 64 on center, and an offset image, created in optical system 150 by the light ray R3 that is reflected into the optical sensor 64 by the mirror 152 and the beam splitter 154. In FIG. 18, the direct image of the swimmer 18a-18f is illustrated in solid lines, while the offset image of the swimmer 18a-18f is shown in broken lines. The direct image will always be on the same side regardless of the position of the swimmer 18, so long as the swimmer 18 is at a greater distance than the convergence distance 3624 of the optical system 150. The direct image will switch sides at a distance from the tracker 16 that is less than the convergence distance 3624. With this arrangement, the swimmer 18a-18f is in the lane if the direct image of the swimmer 18a-18f is in the lane.

Which side the direct image is on will also depend on the optical system 66, 150, 200 that is used. In optical system 150 of FIG. 7, the direct image will always be on the right side at distances greater than the convergence distance 3624, and it will always be on the left side at distances less than the convergence distance 3624.

FIG. 18 shows a variety of potential positions of swimmers 18a-18f. For example, swimmer 18a is outside the boundaries 3620, 3624 of the field of view of the tracker 16, is thus invisible to the tracker 16, and is shown without an offset image for that reason. Swimmer 18b is closer to the tracker 16 than the convergence distance 3624, so its direct image is on the left in this example; however, as can also be seen, the direct image is in the lane. Therefore, swimmer 18b is in the lane. By contrast, with swimmers 18c and 18d, the direct image (i.e., the image to the right) is not in the lane in either case. (In fact, only one stereo copy of swimmer 18c is visible to the tracker 16 in this example; thus, swimmer 18c would likely have been filtered out of consideration in task 354, because there is no visible pair of stereo copies.) Swimmers 18e and 18f are two examples of swimmers 18 in the lane: the direct image of swimmers 18e and 18f is within the lane boundaries 3626.

This kind of method for determining if a swimmer 18 is in the relevant lane thus relies on knowledge of how the optical system 66, 150, 200 produces images. However, there are more hardware-agnostic methods of making the determination, i.e., methods that do not rely on knowledge of how the optical system 66, 150, 200 produces images. For example, by the time method 350 has progressed to task 362, a region of interest has been established around each identified swimmer 18, the distance to each swimmer 18 and his or her position is known, and the swimmers 18 have been matched to templates that dictate, at least in part, whether the swimmer 18 should be tracked. All of that accumulated data may be used to make a determination in task 362 without resorting to a determination based on the underlying optics, if desired.

If the swimmer 18 is determined to be in the lane for which the tracker is responsible (task 362: YES), method 350 continues with task 364. Otherwise (task 362: NO), method 350 returns to task 354 and another image is acquired.

Lane-checking like that performed in task 362 may be omitted in some runs of method 350, or for some swimmers 18 in a run. Once a swimmer 18 has been identified, in earlier tasks, it may not be necessary to check which lane the swimmer 18 is in, because swimmers 18 rarely switch lanes during a workout.

In task 364, method 350 determines whether the identification or identifications of the swimmers 18 that were completed in earlier tasks represent the second or subsequent identification of the same swimmer 18 or swimmers 18. If so (task 364: YES), method 350 continues with task 366; if not (task 364: NO) method 350 returns to task 354 and another image is acquired.

As was described briefly above, method 350 attempts to minimize the use of brute-force image processing to locate the stereo copies of the swimmer 18 in a stereo image. In the initial identification of swimmers 18, some basic assumptions can be used to limit the search to a region of interest. In subsequent identification attempts, method 350 uses a predictive algorithm to predict where the swimmer 18 will next be found and to establish a smaller region of interest in that area. Tasks 366 and 368 represent the core of this predictive algorithm.

If the swimmer 18 has been identified twice, a distance from the tracker 16 in the first identification is known, and a change in distance between the first and second identifications of that swimmer 18 can be calculated. In task 366, method 350 predicts the next distance at which the swimmer 18 will be found based on the previous identifications, typically by taking the most recent distance and adding or subtracting the previous change in distance that was established, or by computing speed over more than one recent image time-slice. Based on the predicted distance for the next acquisition of the same swimmer 18, method 350 continues in task 368 to predict the region of interest (or regions, if multiple swimmers 18 are being tracked) in the next stereo image that is acquired.

The size and parameters of the region of interest established in task 368 may vary from embodiment to embodiment. The size of the region may be based on predetermined constants. For example, a function or functions may be defined based on empirical data that establishes an appropriate size for the region of interest at every relevant distance from the tracker 16. Alternatively, the size of the region of interest could be computed statistically using the established data, with the pixel height and width of the next region of interest essentially being confidence intervals around a computed point at which the stereo copies of the swimmer 18 should next appear. The characteristics of the progressive change in size and position of the region of interest are specific to lap swimming in lanes. For example, the region of interest grows and shifts upward in the image as a swimmer 18 approaches the tracker 16, and operates in reverse as the swimmer 18 moves away from the tracker 16.

If there are multiple swimmers 18 that the tracker 16 is responsible for tracking, task 368 could involve predicting a position for each swimmer 18 and then establishing a region of interest large enough to encompass all of those swimmers 18. Smaller regions of interest would be defined in later tasks for each swimmer 18 in region of interest, e.g., to check the colors of each matched pair of lights against a template. Image areas that are not within a region of interest may simply be cropped out.

Once the next region of interest has been predicted, method 350 continues with task 370, and another stereo image is acquired. The stereo copies of the swimmer 18 or swimmers 18 are again identified in task 372. As compared with earlier identification tasks, like task 356, the efforts of task 372 may be entirely focused within the predicted region of interest within the image, but task 372 may be performed in essentially the same way as task 356: first, an identification of paired lights within the predicted region of interest, and then definition of smaller regions of interest around those pairs of lights to define image regions for comparison with one or more templates. Once task 372 is completed, method 350 continues with task 374, a decision task.

In task 372, if the swimmer 18 is within the predicted region of interest (task 374: YES), method 350 continues with task 380; if the swimmer 18 is not within the predicted region of interest (task 374: NO), method 350 continues with task 376, and the current identification attempt is discarded.

From task 376, method 350 continues with task 378, another decision task. In task 378, if this is the second failure to identify the same swimmer 18 (task 378: YES), then control of method 350 returns to task 354 and the identification process begins anew. If this is not the second failure to identify the same swimmer 18 (task 378: NO), control of method 350 passes to task 384.

As was noted above, if the location of the swimmer 18 was correctly predicted, method 350 continues with task 380, in which the speed of the swimmer 18 is computed. This is usually a straightforward calculation—the difference in the first and second calculated distances from the tracker 16, divided by the elapsed time. The elapsed time can be calculated from the time stamps of successive stereo images. Additional statistics, like acceleration, may be calculated for display or storage. After calculation is complete, method 350 continues with task 382 and the calculated metrics are recorded. Method 350 continues with task 384.

In tasks 384 and 386, method 350 again uses a predictive algorithm to predict the location of the next region of interest, and thus, to simplify image analysis tasks. First, in task 384, method 350 predicts the next distance at which the swimmer 18 is likely to be found, before predicting the location of the next region of interest in task 386.

It should be understood that in predicting the location of the next region of interest, either in tasks 366 and 368 or in tasks 384 and 386, method 350 may take into account other knowledge or assumptions in order to make the necessary predictions. For example, although the above description portrays the path of the swimmer 18 as generally linear, and it may be in many cases, it need not always be. When many swimmers need to practice at the same time, they are often instructed to swim circuits around the interior perimeter of the lane. In most embodiments, the tracker 16 would automatically track swimmers 18 moving in such a pattern. During method 350, the region of interest could be shifted left or right, or it could be expanded, in addition to being moved based on the linear distance calculation. For example, if a swimmer 18 is approaching from the right side of the field of view, the region of interest could be shifted or expanded to the left as the swimmer 18 turns.

Method 350 continues with task 388. At some point in each lap, the display 26 is activated and data is displayed to the swimmer 18. In method 350, data display is based on the distance of the swimmer 18 to the tracker 16, although data display could be based on timing, an explicit request from a swimmer 18, or a request from a coach. The distance at which data is displayed is preferably user-definable, although there may be certain pre-sets; as was described above, the swimmer 18 may input parameters into the tracker 16 that define how task 388 is performed, what data the swimmer 18 wishes to see in each lap, and for how long that data is to be displayed, among other parameters.

Ideally, the data is displayed for long enough (i.e., frozen on the display 26) for the swimmer 18 to appreciate it before making a turn and continuing. If there is only a single swimmer 18, the distance at which the display 26 is triggered can be set at a relatively long distance, so that data is displayed for the entire lap. If there are multiple swimmers 18, it may be helpful to set the display trigger distance such that the display triggers for each swimmer 18. Other variations on this are possible. For example, if there are two swimmers 18 who approach the tracker 16 within a few seconds of each other, the display 26 may be divided into a split screen to display data for both swimmers 18 simultaneously.

If the swimmer 18 is wearing a head-up display or virtual retinal display, the process for triggering and updating those displays could be different; task 388 pertains to the display 26 on the tracker 16.

As one example, the display 26 could be triggered when the swimmer 18 reaches the convergence distance, providing enough time for the swimmer 18 to see and appreciate the data on the display before completing a lap or turning. In method 350, if it is time to trigger the display (task 388: YES), method 350 continues with task 390. If it is not time to trigger the display (task 388: NO), control of method 350 returns to task 370 and another image is acquired.

In task 390, data is computed and displayed on the display 26. In the most basic cases, that data might include lap count, lap time, total elapsed time and, perhaps, the swimmer's average speed. However, a broad range of data, messages, and metrics could be displayed on the display 26 both as a result of task 390 and throughout the use of a tracker 16.

For example, as will be described below in more detail, trackers 16 may be networked, either in a peer-to-peer configuration or through a central node or server. In a networked configuration, multiple trackers 16 could simultaneously track multiple swimmers 18 and report the times of each swimmer 18 to one another so that, for example, a swimmer 18 could be given his or her current times and counts as well as a ranking or the times and counts of the leader. The competitors in a situation like this may be local or remote, and they may compete at the same time or at different times. For example, if a swimmer 18 is engaged in a workout that his or her competitors have already completed, the display 26 might display the results for the individual swimmer 18 as compared to other swimmers 18 at the same point in the same workout.

In addition to live and delayed competition, a swimmer 18 may choose to have the tracker 16 measure his or her performance against stored performance data from their own history or from competitive swimmers. The tracker 16 may store data on competition times and results from recent competitions, such as Olympics, world championships, and other such competitions, and could measure the performance of the swimmer 18 against this kind of stored data, displaying appropriate comparisons in task 390 and at other appropriate points.

As shown in FIG. 5, and as will be described below in more detail, the tracker 16 may be in communication with a coach station 78, at which a coach can view the output from the tracker 16 in real time, along with any images or video that the tracker 16 generates. During task 390, and at other appropriate points, the coach may send a message to the swimmer 18 that will be displayed on the display.

As was explained above with respect to method 300, some of the data computed and displayed in task 390 may be assumed or interpolated, particularly in cases where the tracker 16 takes into account the speed of the swimmer 18 and projects the actual lap completion time of the swimmer 18. If more accuracy is necessary, the tracker 16 could include an additional, traditional still camera and the light-based method of U.S. Patent Application Publication No. 2017/0178524 could be used.

Once data has been displayed, method 350 continues with task 392, a decision task. In task 392, if the interval is complete (task 392: YES), method 350 completes and returns at task 394. If the interval is incomplete, control of method 350 returns to task 370 and another stereo image is acquired. Assuming that the interval is incomplete, when control of method 350 returns to task 370, it may be returned with a parameter or other directive to use the initial outgoing region of interest to locate the swimmer 18.

In a typical case, one would want on the order of ten valid data points (i.e., distance readings) on a swimmer 18 over a length of the swimming pool 10 in order to establish reliable speed and timing data. Given that a tracker 16 with sufficient computing power would likely be able to run method 350 many more than ten times while the swimmer 18 completes a length of the pool, methods according to the present embodiments may be highly fault tolerant. In some cases, acquisition error rates of 20% or greater may be permissible in individual ranging operations without compromising the ability to track a swimmer 18 or to provide useful within-length measures in addition to completed lap measures. Of course, if there are multiple swimmers 18 in the field of view, method 350 would be run with sufficient frequency to acquire ten valid data points for each swimmer 18.

Method 300, method 350, and other methods described herein may be reduced to sets of machine-readable instructions stored on non-transitory machine-readable media that, when executed, cause a machine, such as the tracker 16, to execute the tasks of the methods. Non-transitory media include flash memory, solid state drives, traditional hard disk drives, and portable media.

The above description assumes that there is one tracker 16, in one lane, at one end of the swimming pool 10. That need not always be the case. While one device, like tracker 16, at one end of the swimming pool 10 is sufficient to track and time a swimmer 18 traveling in both directions along the entire length of the swimming pool 10, there are circumstances in which it may be desirable to include other devices, e.g., if the swimmer 18 or a coach wants a time display at both ends of the swimming pool 10.

Figure 19:
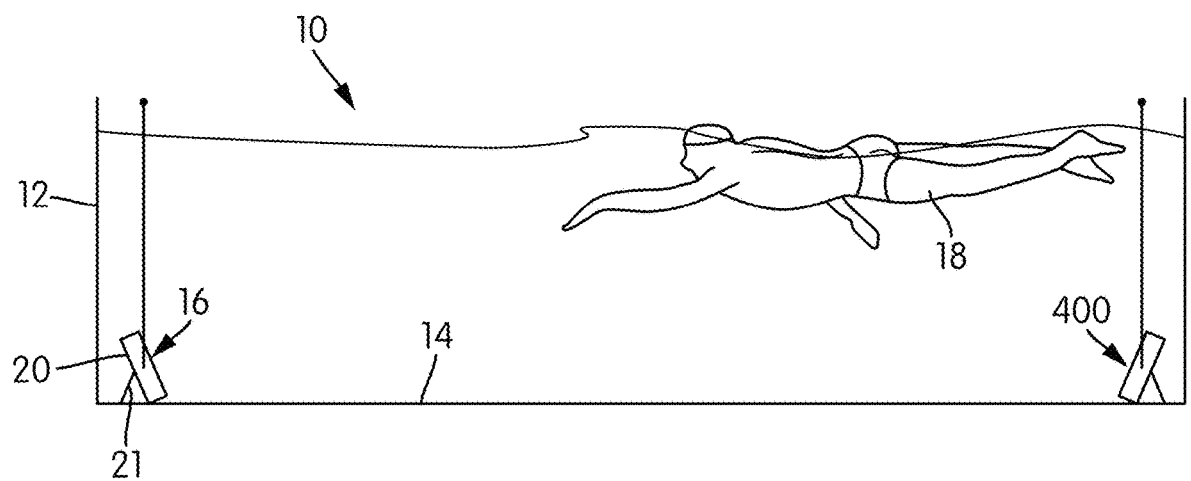
FIG. 19 is an illustration of a swimmer in a swimming pool equipped with a digital-optical object tracker and a secondary device.

FIG. 19 is an illustration of a swimmer 18 in a swimming pool 10, similar to the view of FIG. 1. In FIG. 19, a tracker 16 is at one end of the swimming pool 10, and a second device, generally indicated at 400, is at the other end of the swimming pool. The nature of the second device 400 may vary from embodiment to embodiment.

In one embodiment, the second device 400 may be a second tracker 16 with identical or nearly identical features. In that case, the software controlling the two trackers 16, 400 would allow the tracker 16 to be put in a "master" mode and the second device 400 to be put in a "slave" mode, or vice-versa. In "slave" mode, the second device 400 would receive tracking data from the master tracker 16 and display that data as appropriate. In this role, the optical system 66, 150, 200 of the second device 400 would usually go unused. If the swimmer 18 or coach requires accurate lap completion, rather than interpolated data, the second device 400 could include an additional camera and implement the light-based methods of U.S. Patent Application Publication No. 2017/0178524 to determine when the swimmer 18 has completed a lap.

The second device 400 need not be a full-scale tracker 16. Instead, it could be a scaled-down unit with more limited capabilities. Such a unit, for example, might include a transceiver 56, an antenna 42, a display 26 and display controller 68, and a main control unit of lesser capabilities than the main control unit 52 of the tracker 16. The second device 400 need not include an optical system 66, 150, 200, but may include a single still or video camera, either to take video for biomechanical analysis or to provide a more accurate determinant of when the swimmer 18 has completed a lap, as described above. For ease of manufacturing, it is helpful if the tracker 16 and the second device 400 share as many parts as possible, even if the second device 400 has lesser capabilities.

Figure 20:
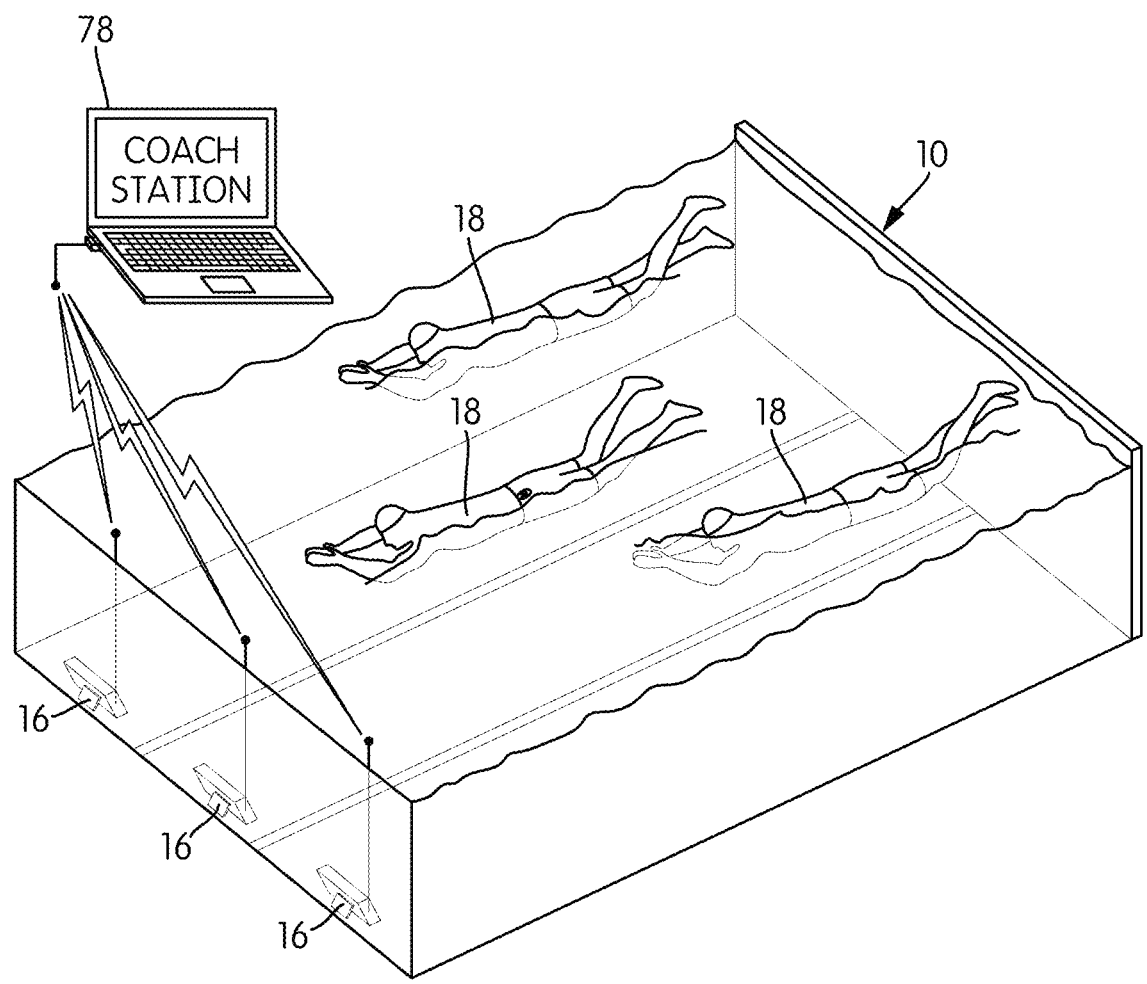
FIG. 20 is a perspective view of a swimming pool with several swimmers, illustrating the use of multiple digital-optical object trackers and a coach station.

While one tracker 16 can track multiple swimmers 18 in the same lane, if there are several swimmers 18 in different lanes, multiple trackers 16 may be used in the swimming pool 10 at the same time. FIG. 20 is a perspective view of a portion of a swimming pool 10, illustrating three swimmers 18, each in his or her own lane. As shown, there are three trackers 16 in the swimming pool 10, one in each lane. Each tracker 16 tracks a single one of the swimmers 18. Although not shown in FIG. 20, a second device 400 could be placed at the opposite end of each lane to display information to each swimmer 18.

As was described briefly above, when multiple trackers 16 are in use, they may be networked together. FIG. 20 also illustrates this, with three trackers 16 in communication with a coach station 78. The coach station 78 may be a laptop computer, a desktop computer, a tablet, a smart phone, or any other computing device capable of performing the functions described here. The communication between the coach station 78 and the trackers 16 may be direct, e.g., through a dedicated radio frequency, or it may be through a standard networking protocol, such as WiFi or BLUETOOTH®, with a router or other such network device serving to control and direct data traffic.

The coach station 78 allows a coach or another interested observer to view the data generated by the individual trackers 16, to send messages to the trackers 16 to be displayed on their displays 26 and, in some cases, to assume control over the trackers 16. The coach station 78 may also have access to raw data from the trackers 16, or, at least, to a broader range of data than is displayed on the individual displays 26 during workouts. For example, the coach station 78 may record each lap time, the details of the workout and its intervals, and any past workouts by the same swimmer 18. If the time shown to the swimmer 18 by each tracker 16 is interpolated, the coach station 78 may be sent the actual data on which the interpolation was based. If the tracker 16 is used with other devices, like the observation vehicle disclosed in U.S. patent application Ser. No. 16/223,749, the coach station 78 may receive and aggregate data from those devices as well.

In some cases, the coach station 78 may have access to and control over the trackers 16, providing it, e.g., with the ability to program workouts and to select pre-programmed workouts, the ability to start and stop data collection, and the ability to reset lap and workout times. The coach station 78 may also specify the identities of the swimmers 18 and the colors or other identifiers associated with any modules, reflectors, tags, or other identifiers that they may be wearing. Some of this functionality may also be accessible to an optional remote control 79 that is separately in communication with the tracker 16. The remote control 79 may communicate with the tracker 16 via the antenna 42, but it could also communicate with the tracker 16 by other means, including ultrasound, underwater radio, or light.

Although one coach station 78 is shown in FIG. 20, multiple coach stations 78 may be used. For example, the trackers 16 could be in simultaneous communication with a laptop and two smart phones, so that three different coaches can simultaneously see the information for all of the swimmers 18 or an individual swimmer 18. In some cases, if there are multiple coach stations 78, one station 78 could be designated as the "master" coach station 78 and could set the level of data access for each of the other stations 78.

The coach station 78 allows remote, real-time monitoring of swimmer performance using data from the tracker 16. However, the coach station 78 is optional, and need not be used in all embodiments. As was described above, multiple trackers 16 may operate in a peer-to-peer mode without a coach station 78 to time several swimmers 18 in a competition or workout. Generally speaking, data that is not displayed on the display 26 during a workout may be stored in the tracker 16 for later download and reference.

In peer-to-peer mode, in addition to sharing performance metrics, the individual trackers may collaborate programmatically. For example, if one tracker 16 confirms that a swimmer 18 who was visible in its lane is no longer visible, a message may be sent to trackers 16 in adjacent lanes to locate and resume tracking the swimmer 18. When the trackers 16 are networked together in a peer-to-peer configuration, all of the trackers 16 may be slaved to a "master peer" for certain purposes, e.g., to start intervals simultaneously.

While the invention has been described with respect to certain embodiments, the description is intended to be exemplary, rather than limiting. Modifications and changes may be made within the scope of the invention, which is defined by the appended claims.

What is claimed is:

1. A method, comprising:
   obtaining a series of digital stereo images of a swimmer during a workout, each stereo image having a separation distance between stereo copies of the swimmer, using a stereo optical tracking device placed underwater in a position to observe the swimmer;
   for each of the series of digital stereo images, deriving, based on the separation distance, a physical distance to the swimmer;
   determining, during the workout and based, at least in part, on the physical distances to the swimmer, performance metrics for the swimmer; and
   displaying at least some of the performance metrics to the swimmer during the workout.

2. The method of claim 1, wherein said deriving comprises using a non-trigonometric function that relates the separation distance to the physical distance to the swimmer.

3. The method of claim 2, wherein the non-trigonometric function is derived from empirical data.

4. The method of claim 1, wherein the performance metrics comprise one or more of speed of the swimmer, moment-to-moment velocity, pacing information, stroke count, lap count, lap time, interval time, or total time.

5. A method, comprising:
   obtaining a series of digital stereo images of one or more swimmers during a workout using a stereo optical tracking device placed underwater in a position to observe the one or more swimmers, each of the series of digital stereo images having two or more stereo copies of the one or more swimmers;
   for each of the series of digital stereo images
      locating one or more matched pairs of the two or more stereo copies,
      associating the one or more matched pairs with the one or more swimmers based on one or more identifying characteristics, and
      determining physical distances to the one or more swimmers based on separation distances of the associated matched pairs of the two or more stereo copies;
   tracking the one or more swimmers during at least a portion of a workout based on the physical distances;
   calculating, based, at least in part, on said tracking, one or more performance metrics for the one or more swimmers; and
   displaying at least some of the one or more performance metrics to the one or more swimmers during the workout.

6. The method of claim 5, wherein said determining physical distances to the one or more swimmers comprises using a non-trigonometric function to derive the physical distances from the separation distances.

7. The method of claim 6, wherein the non-trigonometric function is derived from empirical data.

8. The method of claim 6, wherein the non-trigonometric function comprises a function of functions.

9. The method of claim 5, wherein the performance metrics include one or more of speed, moment-to-moment velocity, pacing information, stroke count, lap count, lap time, interval time, or total time for the one or more swimmers.

10. The method of claim 5, wherein the one or more swimmers are swimming within a tracking area defined by the stereo optical tracking device and the method further comprises excluding other swimmers who appear in the set of stereo optical images but who are not within the tracking area.

11. The method of claim 5, wherein the one or more identifying characteristics comprise color.

12. The method of claim 11, wherein the color comprises colored light emitted by a light module worn by the one or more swimmers.

13. The method of claim 11, wherein said associating comprises comparing the one or more matched pairs with one or more templates.

14. The method of claim 13, wherein the one or more templates specify a color of emitted light associated with for each of the one or more swimmers.

15. The method of claim 5, wherein said locating comprises:
    predicting one or more regions of interest in each of the set of stereo images; and
    searching for the one or more matched pairs within the one or more regions of interest.

16. The method of claim 15, wherein the one or more identifying characteristics comprise a light specific to each of the one or more matched pairs.

17. The method of claim 16, wherein said associating comprises
    defining a small region of interest around each of the one or more matched pairs; and
    comparing each of the small regions of interest with one or more templates.

18. The method of claim 17, wherein said searching for the one or more matched pairs within the one or more regions of interest further comprises:
    searching for all of the lights within the one or more regions of interest;
    determining, based on a predefined set of constraints, which of the lights within the one or more regions of interest constitute the one or more matched pairs.

19. The method of claim 18, wherein the predefined set of constraints comprises a horizontal alignment of the lights and a maximum spacing of the lights.

20. The method of claim 19, wherein said searching for the one or more matched pairs within the one or more regions of interest is performed with black and white or grayscale versions of the set of stereo images and said comparing each of the small regions of interest with one or more templates is performed with color versions of the set of stereo images.

* * * * *